(12) United States Patent  
Engelhardt et al.

(10) Patent No.: US 8,810,922 B2  
(45) Date of Patent: Aug. 19, 2014

(54) FIXED FOCAL LENGTH OPTICAL LENS ARCHITECTURE PROVIDING A CUSTOMIZED DEPTH OF FOCUS OPTICAL SYSTEM

(71) Applicant: DigitalOptics Corporation Europe Limited, Ballybrit (IL)

(72) Inventors: Kai Engelhardt, Buckenhof (DE); Pavel Reshidko, Tel-Aviv (IL); Gal Shabtay, Tel-Aviv (IL); Ephraim Goldenberg, Ashdod (IL)

(73) Assignee: Fotonation Limited, Dublin (IE)

( * ) Notice: Subject to any disclaimer, the term of this patent is extended or adjusted under 35 U.S.C. 154(b) by 0 days.

(21) Appl. No.: 14/053,543

(22) Filed: Oct. 14, 2013

(65) Prior Publication Data

US 2014/0043518 A1 Feb. 13, 2014

Related U.S. Application Data

(62) Division of application No. 12/620,936, filed on Nov. 18, 2009, now Pat. No. 8,559,118.

(51) Int. Cl.
*G02B 13/18* (2006.01)
*G02B 9/60* (2006.01)

(52) U.S. Cl.
USPC .......................... 359/714; 359/763; 359/764

(58) Field of Classification Search
USPC ......................................... 359/714, 763–766
See application file for complete search history.

(56) References Cited

U.S. PATENT DOCUMENTS 6,445,513 B2 9/2002 Sato
6,636,364 B2 10/2003 Sato
(Continued)

FOREIGN PATENT DOCUMENTS

EP 1712944 A2 10/2006
EP 1840619 A1 10/2007
EP 2113800 A1 11/2009

OTHER PUBLICATIONS

International Search Report and Written Opinion, mailing date May 23, 2011, for International Application No. PCT/EP2010/007019, 17 pages.

(Continued)

*Primary Examiner* — Scott J Sugarman
(74) *Attorney, Agent, or Firm* — Amin, Turocy & Watson, LLP

(57) ABSTRACT

Providing for a fixed focus optical system exhibiting extended depth of field is provided herein. By way of example, a compact and fast optical system that yields an asymmetric modulation transfer function (MTF) is disclosed. In some aspects, the asymmetric MTF results in extended depth of field for near field objects. Such a response can be particularly beneficial for small handheld cameras or camera modules having high resolution. According to some disclosed aspects, the resolution can be about 8 mega pixels. Additionally, the optical system can comprise four lenses in one aspect and five lenses in another, while remaining below about 5.3 mm total track length (TTL) for the respective systems. In at least one application, the disclosed optical systems can be employed for a high resolution compact camera, for instance in conjunction with an electronic computing device, communication device, display device, surveillance equipment, or the like.

21 Claims, 27 Drawing Sheets

(56) References Cited

U.S. PATENT DOCUMENTS

| | | |
|---|---|---|
| 6,909,559 B2 | 6/2005 | Nishina |
| 6,917,479 B2 | 7/2005 | Park |
| 7,133,220 B2 | 11/2006 | Nishina |
| 7,158,317 B2 | 1/2007 | Ben-Eliezer et al. |
| 7,295,386 B2 | 11/2007 | Taniyama |
| 7,443,610 B1 | 10/2008 | Lin et al. |
| 7,545,587 B2 | 6/2009 | Kubota |
| 7,558,005 B2 | 7/2009 | Yasuhiko |
| 2002/0048091 A1 | 4/2002 | Sato |
| 2003/0184883 A1 | 10/2003 | Sato et al. |
| 2007/0081258 A1 | 4/2007 | Huang |
| 2008/0180813 A1 | 7/2008 | Taniyama |
| 2009/0128927 A1 | 5/2009 | Chen et al. |
| 2010/0271713 A1 | 10/2010 | Tang et al. |
| 2010/0321793 A1 | 12/2010 | Lin |
| 2013/0057973 A1* | 3/2013 | Kubota et al. .................. 359/764 |
| 2013/0258499 A1* | 10/2013 | Hashimoto .................. 359/714 |

OTHER PUBLICATIONS

Notice of Allowance dated Jun. 10, 2013 for U.S. Appl. No. 12/620,936, 24 pages.

* cited by examiner

FIXED FOCAL LENGTH OPTICAL LENS ARCHITECTURE PROVIDING A CUSTOMIZED DEPTH OF FOCUS OPTICAL SYSTEM

CROSS REFERENCE TO RELATED APPLICATION

This application is a divisional of U.S. patent application Ser. No. 12/620,936, filed Nov. 18, 2009, which is related to International Patent Application No. PCT/US2008/012670 entitled CUSTOMIZED DEPTH OF FIELD OPTICAL SYSTEM AND COMPACT FAST LENS ARCHITECTURE, filed Nov. 7, 2008, assigned to the assignee hereof and expressly incorporated by reference herein.

FIELD OF THE INVENTION

The following relates generally to imaging optics, and more specifically to a compact fixed position lens architecture providing a focused image over an extended depth of field at a relatively high resolution.

BACKGROUND

Applications for optics and optical devices have become numerous and widespread in recent years, expanding upon traditional uses such as telescopes, microscopes and eyeglasses, into various other areas. Cameras and video cameras have become one very popular consumer application, in which precision optics are desired for high-end devices. But imaging optics have played a significant part in modern technology for a wide range of fields, including consumer electronics (e.g., DVD or CD readers, cameras and telescopes), fiber optic communications (e.g., optical couplers and multiplexers), medicine and surgical tools (e.g., precision microscopy, fiber optic probes, MRI and X-Ray machines), military and defense (e.g., laser guided weaponry), and robotics (e.g., artificial sight), as well as a host of other applications. Although modern optical systems are diverse, one of the most interesting recent advancements has been in the field of miniature and micro optics, particularly for digital cameras.

The use of digital imaging sensors and micro optics for cameras and video cameras has made the continuing miniaturization of these devices possible. As a result, camera modules have been integrated into small electronic devices, including hand-held devices such as cell phones, smartphones and personal digital assistants (PDAs), computing devices such as laptops, net-books and desktop computers, display devices such as televisions, monitors and graphics displays, hidden or inconspicuous surveillance equipment, and so forth. Improvements in image sensors have provided high resolution image detectors utilizing micro-scale pixilation, and at high signal to noise ratio and increasingly lower cost. As digital sensors have improved, advancements in optical systems would be desirable to exploit the potential advantages of high resolution systems.

For example, it would be desirable to have an optical system that can provide enhanced performance and depth of field (EDoF) for a thin and sleek electronic device (e.g., a camera phone) using a high resolution sensor with approximately eight mega pixels. It would also be desirable to have optical systems that can provide the enhanced quality for a range of f-numbers (e.g., between two and three).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In certain embodiments, the subject disclosure provides fixed focal length optical systems resulting in extended depth of field (EDoF). In some aspects of the subject disclosure, a five lens system is provided. The five lens system can have an f-number of about 2.4, and can result in an asymmetric modulation transfer function (MTF) that provides extended image sharpness or EDoF for objects relatively near to the optical system. For an optical system that cannot be refocused to image near objects, this optical system can provide a significant improvement over typical fixed focus camera optics. The five lens design can have a total track length (TTL) of less than about 5.3 mm, resulting in a compact yet fast optical system well suited for small electronic devices (e.g., a thin, hand-held cell phone, display device, computing device, etc.).

According to further aspects of the subject disclosure, disclosed is an additional optical system providing EDoF. The additional optical system can be a four lens system in at least some disclosed aspects. The four lens system can have an f-number of about 2.8 and TTL of less than about 5.35 in at least one aspect. Furthermore, the four lens system can exhibit extended near field resolution and relatively small distortion.

In at least one aspect of the subject disclosure, an alternate four lens optical system is provided. The alternate four lens system can exhibit extended near field resolution, making such system a good fit for small electronic devices, and can further have an asymmetric through focus MTF (TF-MTF) response. Particularly, the TF-MTF can remain above about 0.15 for about one and a half (1.5) to two (2) times as many negative focal shifts (in microns) as positive focal shifts (also in microns). This can result in beneficial near field image resolution. According to further aspects, the alternate four lens system can have an f-number of about 2.8 and TTL of less than about 5.3 mm. Moreover, the alternate four lens system can have a TTL to image size ratio of less than about 0.92 in at least one disclosed aspect.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
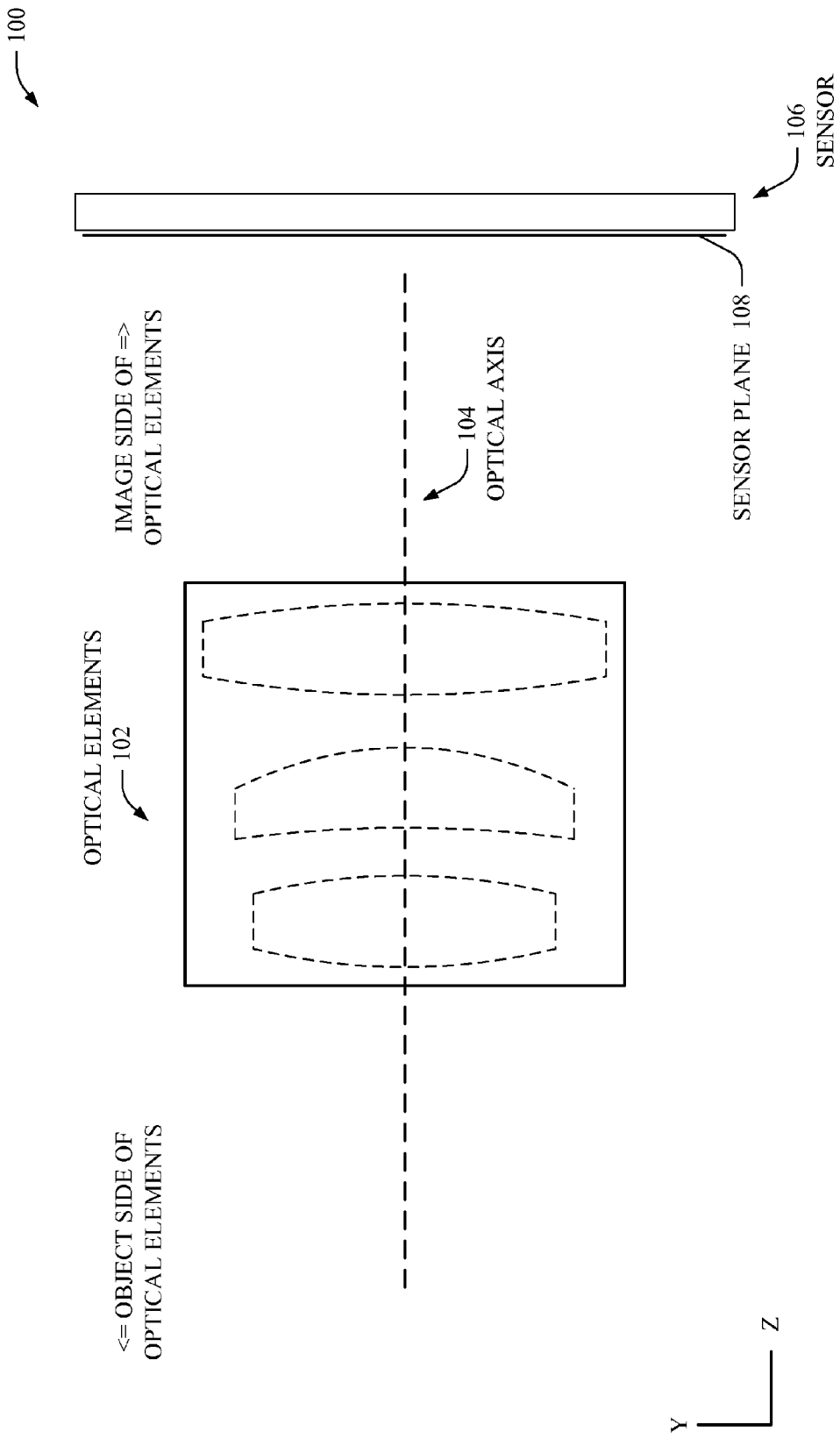
FIG. 1 depicts a block diagram of an example optical imaging system representative of various aspects of the subject disclosure.

Various aspects are now described with reference to the drawings, wherein like reference numerals are used to refer to like elements throughout. In the following description, for purposes of explanation, numerous specific details are set forth in order to provide a thorough understanding of one or more aspects. It will be evident, however, that such aspect(s) can be practiced without these specific details. In other instances, well-known structures and devices are shown in block diagram form in order to facilitate describing one or more aspects.

In addition, it should be apparent that the teaching herein can be embodied in a wide variety of forms and that the specific structures or functions disclosed herein are merely representative. Based on the teachings herein one skilled in the art should appreciate that the disclosed aspects can be implemented independently of other aspects, and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the apparatuses and lens systems disclosed herein are described in the context of providing high resolution optical imaging via compact fixed position optical lens arrangements. One skilled in the art should appreciate that similar techniques could apply to other optical lens architectures. For example, the lens arrangements used herein may be used in mechanical focus or auto-focus systems whereby the optical arrangement is automatically or manually displaced relative to the image plane.

Referring now to the drawings, FIG. 1 depicts a block diagram of an example optical system 100 according to aspects of the subject disclosure. System 100 comprises an arrangement of optical elements 102 positioned in a like manner relative an optical axis 104. As utilized herein, an optical element refers to a single piece of refractive or reflective material at least partially transparent to electromagnetic radiation at least within the visible spectrum (e.g., approximately 400 to 700 nanometers [nm]). Examples of suitable material include ground and polished glass, molded glass or replication molding process, weight to level optics (WLO), injection-molded plastic, etched micro optics, or the like. Additionally, an optical element will have at least one refractive or reflective surface. One example of an optical element utilized herein is an optical lens. An optical lens is an optical element comprising two opposing refractive surfaces, and an edge between the opposing surfaces that defines an outer diameter (for a circular lens) or perimeter of the lens. A typical arrangement of optical lenses includes a series of lenses 102 at least generally transverse to an axis (optical axis 104). It should be appreciated, however, that other possible arrangements can exist consistent with the subject disclosure. A "lens component" is defined herein as (A) a single lens element spaced so far from any adjacent lens element that the spacing cannot be neglected in computing the image forming properties of the respective lens elements, or (B) two or more lens elements that have adjacent lens surfaces either in full overall contact or so close together that any spacing between the adjacent lens surfaces are so small that the spacing(s) can be neglected in computing image forming properties of the two or more lens elements. Thus, some lens elements can also be lens components, and the terms "lens element" and "lens component" are not mutually exclusive terms. In addition, it should be appreciated that the term "optical component" is utilized herein to refer to a superset of items having significant properties related to imaging optical systems, and includes optical elements such as lens elements and lens components, as well as optical stops, but can also include various other items such as a thin film, a bandpass filter, a lowpass or highpass filter, a polarizing filter, a mirror, etc.

Light entering the left side, or object side, of optical elements 102 can interact sequentially with respective elements (102) and exit the right side, or image side, of the elements 102, toward an optical sensor 106. It should be appreciated that not all light interacting with the left side of the optical elements 102 will be transmitted to the sensor 106; some light can be reflected off of respective elements (102), some light can be scattered away from the optical axis 104 and absorbed (e.g., by an optical stop—not depicted), and so forth. However, in general, the optical elements 102 will receive light from an object on one side of the elements (e.g., the left side) and form a real image of the object on an opposite side of the elements (e.g., on the right side). The real image will be formed along the optical axis 104 a certain distance from the optical elements 102, called an image distance (ID). Notably, the ID depends primarily on a corresponding object distance (OD—distance between the object and the optical elements 102 along the optical axis 104) and a refractive power, or optical power, of the combined optical elements 102.

Sensor 106 can be a digital device comprising a multi-dimensional array (e.g., a two dimensional array) of electro-optical sensors, or pixels. Examples of such a device can include a charge-coupled device (CCD) array, or a complementary metal-oxide semiconductor (CMOS) array, or the like. Each electro-optical sensor, or pixel, of such array is configured to output an electric signal when irradiated with light. Furthermore, an amount of electric current for the electric signal is directly related to energy density of light irradiating the pixel. Accordingly, by collecting output current levels from each pixel of the array, sensor 106 can digitally reproduce a two dimensional radiant energy pattern of light irradiating the sensor 106. Additionally, where the pixel surface or sensor plane 108 of sensor 106 is placed at the above-mentioned ID, the two dimensional radiant energy pattern that is produced is that of a real optical image generated by optical elements 102. Accordingly, sensor 106 can be utilized to digitally reproduce that image.

Resolution of a digital image generated by sensor 106 depends on a number of pixels within the sensor plane array 108, which in turn is dependent on pixel area and total array area. Thus, for example, for relatively square pixels approximately 1.4 microns per side (1.96 square microns), a 0.4 cm square sensor array can comprise as many as 8.1 megapixels (Mp). Said differently, such a sensor would have resolution of about 8 Mp. Because the pixel array generates an electronic reproduction of a real image, data generated by sensor 106 in the form of electric signals can be saved to memory, projected to a display for viewing (e.g., digital display screen), edited in software, and so on. Thus, at least one application of optical system 100 is in conjunction with a digital camera or video camera comprising a digital display (not depicted). Furthermore, optical system 100 and other optical systems included in the subject disclosure can be implemented in conjunction with a camera module of an electronic device. Such an electronic device can include a wide array of consumer, commercial or industrial devices. Examples include consumer electronics, including a cell phone, smart phone, laptop computer, net-book, PDA, computer monitor, television, flat-screen television, and so forth, surveillance or monitoring equipment, including commercial equipment (e.g., ATM cameras, bank teller window cameras, convenience store cameras, warehouse cameras and so on), personal surveillance equipment (e.g., pen camera, eyeglass camera, button camera, etc.), or industrial surveillance equipment (e.g., airfield cameras, freight yard cameras, rail yard camera, and so on). For instance in consumer electronics, because optical elements 102 can comprise elements having fixed positions relative other elements, and having either static or dynamic position along the optical axis 104, system 100 and other disclosed systems are well suited for various types of mini or micro camera modules. It is to be appreciated, however, that the disclosed systems are not limited to this particular application; rather, other applications known to those of skill in the art or made known by way of the context provided herein, are included within the scope of the subject disclosure.

Figure 2:
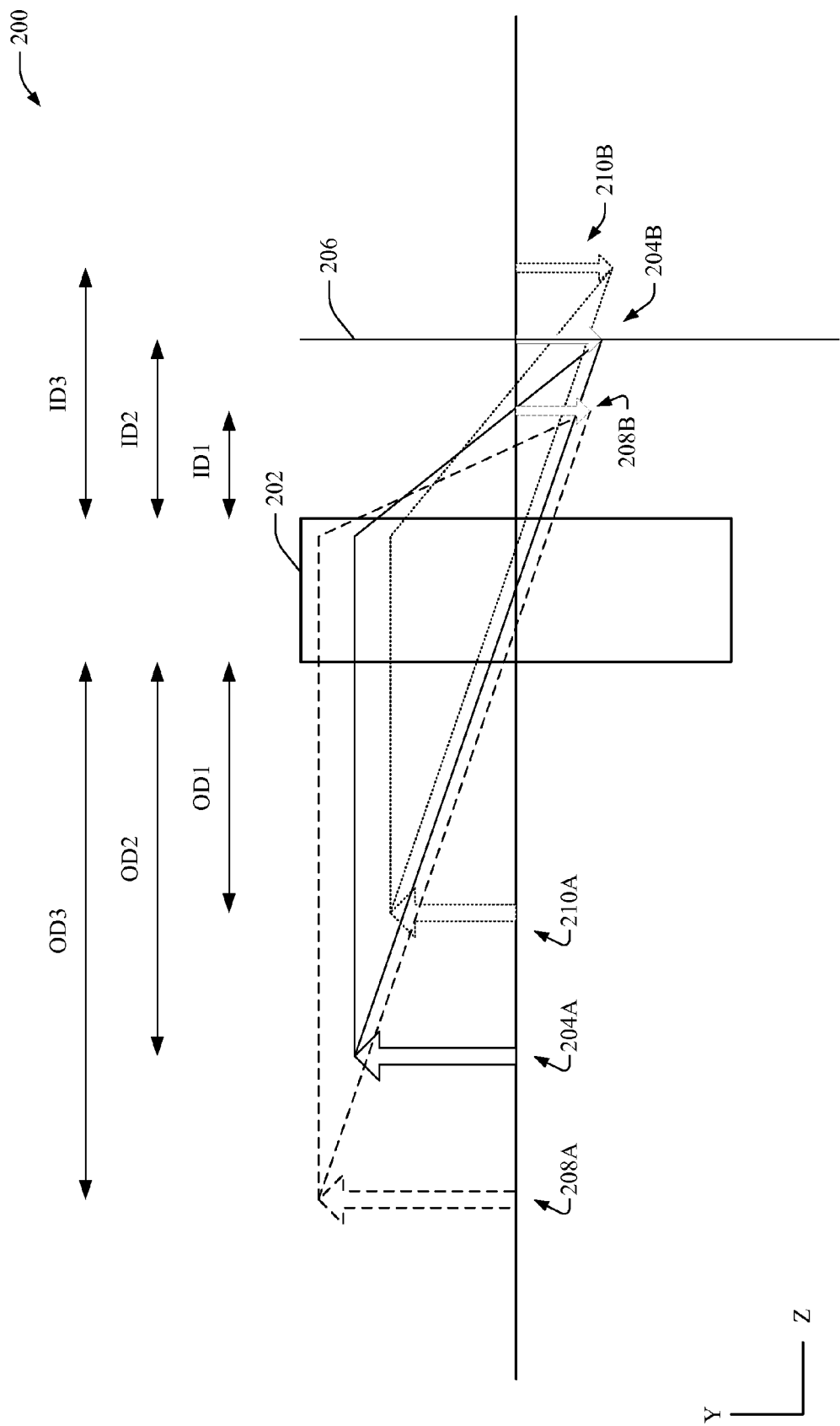
FIG. 2 illustrates a block diagram of a sample imaging system providing context for various disclosed aspects.

FIG. 2 illustrates a block diagram of a sample optical imaging arrangement 200 according to further aspects of the subject disclosure. Particularly, the depicted arrangement 200 includes a set of optical elements 202, a set of different sized objects (204A, 208A, 210A) at respective distances (OD1, OD2, OD3) from the optical elements 202, and a corresponding set of real images (204B, 208B, 210B) generated by the optical elements 202 at respective image distances (ID1, ID2, ID3). The arrangement also includes an image sensor plane 206 (e.g., comprising a pixilated array of electro-optical sensors) at a fixed or focus-adjustable distance (ID2) from optical elements 206.

In some aspects of the subject disclosure, this distance (ID2) corresponds to a hyperfocal image distance for optical elements 202. Said differently, sensor 206 can be placed at a distance where the optical elements 202 form a real image of an object (204A) at the hyperfocal distance, or hyperfocal object distance (OD2), associated with elements 202. Typically, depth of field for a set of optical elements is maximized when the elements are focused at the hyperfocal distance. Thus, in the case of a fixed focus system (202) that cannot be physically adjusted to bring near and far objects into focus, the sensor 206 will generally be positioned at the hyperfocal image distance, to maximize depth of field. (It should be appreciated, however, that sensor 206 can be positioned at the hyperfocal image distance for a focus-adjustable system [202] as well.) The term depth of field as utilized herein refers to a range of distances in object space over which a set of optical elements (202) can form a sharp image. Conversely, depth of focus refers to a range of distances in image space having less than a maximum circle of confusion (that is, over which an infinitesimal point in object space is imaged to a circle less than a threshold maximum size). Even in auto-focus systems, there is still benefit to maximizing focus in front of and behind a desired image or object distance.

As depicted, optical elements 202 generate an image 210B of object 210A, located at a distance OD1 in object space (on the object side of optical elements 202), at a distance ID3 in image space (on the image side of optical elements 202). Likewise, optical elements 202 generate respective images 204B and 208B of objects 204A and 208A. These images 204B, 208B, 210B will be sharply focused if they fall within a depth of focus range for optical elements 202. Thus, if the depth of focus for optical elements 202 extends from ID1 to ID3, then distances OD1 through OD3 comprise the maximum depth of field for optical elements 202, and vice versa.

It should be appreciated that the optical imaging arrangement 200 depicted in FIG. 2 is not intended to be an optically accurate system. For instance, respective image and object distances are not intended to be proportionately accurate for any given effective focal length of optical elements 202. Moreover, respective image and object heights are not intended to portray an accurate magnification for a real optical system. Rather, arrangement 200 is intended to provide a visual context of an imaging system to aid conceptual understanding of other aspects disclosed herein.

Figure 3:
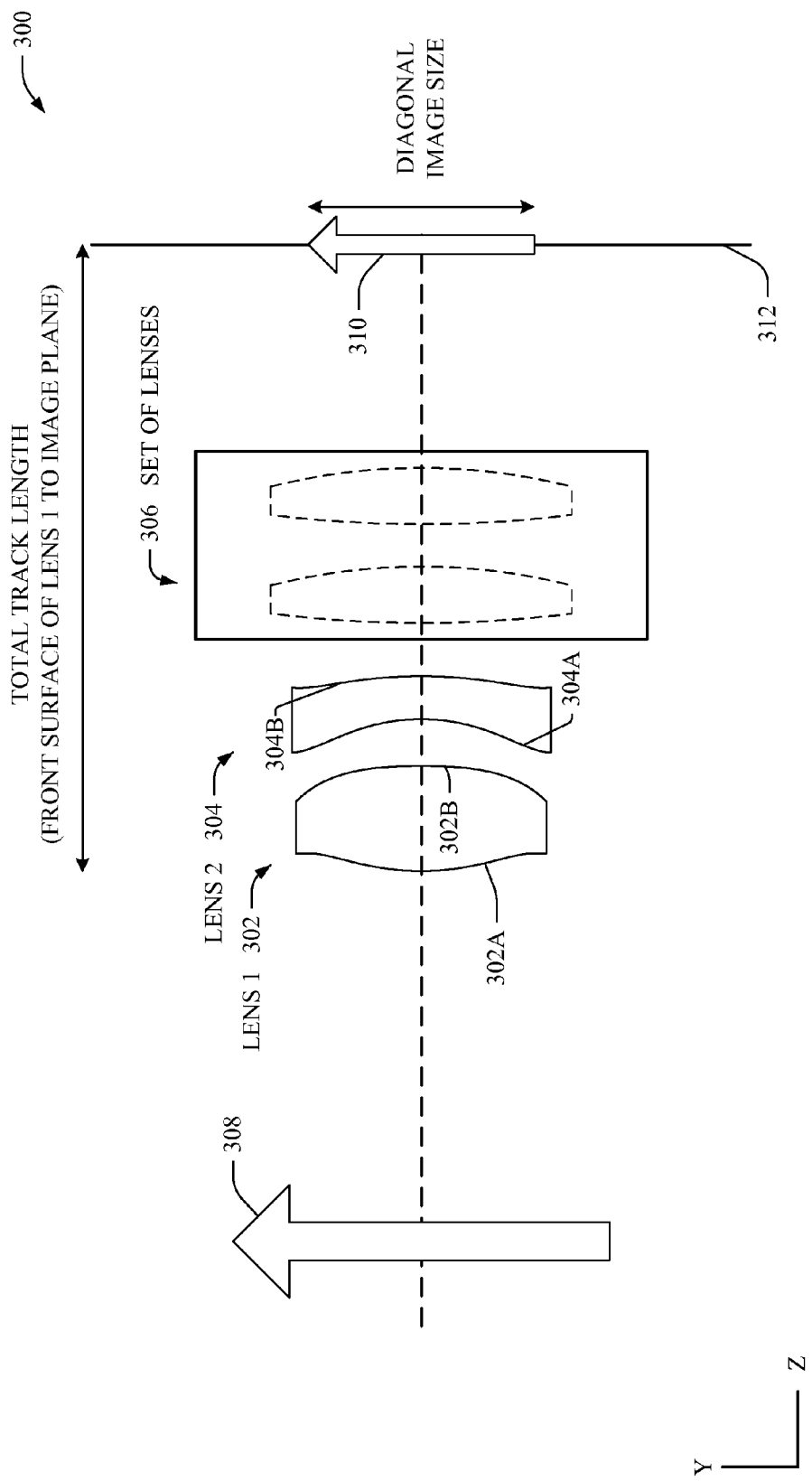
FIG. 3 depicts a block diagram of an example optical system that can be configured to provide a variety of imaging properties.

FIG. 3 depicts a block diagram of an example optical system 300 comprising a fast lens architecture according to aspects of the subject disclosure. As utilized herein, a fast lens architecture refers to an optical system having a relatively large maximum aperture, or small f-number. In photography, a large maximum aperture (small f-number) delivers more illumination to a focal plane, allowing a faster shutter speed. Conversely, a small maximum aperture (large f-number) requires a longer shutter speed for comparable illumination of the focal plane. For moving objects, a faster shutter speed can mitigate blurriness of an image. In at least one aspect of the subject disclosure, optical system 300 can have an f-number of about 2.8. In one or more other aspects, optical system 300 can have an f-number of about 2.4. It should be appreciated that other f-numbers can be achieved for optical system 300, within this range (2.4-2.8) or outside of it.

Optical system 300 comprises a first lens 302 centered upon an optical axis, and a second lens 304, also centered upon the optical axis. Lens 302 has two opposing optical surfaces, an object side surface 302A and an image side surface 302B, and is a biconvex lens (both surfaces 302A, 302B are convex). In addition, lens 302 typically has large positive refractive power. As utilized herein, the terms large or small refractive power (whether positive or negative) are intended to be relative to other lenses of a particular optical system. Thus, for instance, referring to lens 302 as having large positive refractive power implies that lens 302 has greater than average positive refractive power as compared with other positive power lenses of optical system 300. Conversely, a lens having small positive refractive power for optical system 302 will have less than the average positive refractive power. Lens 304 is a meniscus shaped lens (having smaller thickness near the optical axis than away from the optical axis) having two opposing surfaces, a concave object side surface 304A and a convex image side surface 304B. In some aspects of the subject disclosure, lens 304 has small negative refractive power.

In addition to the foregoing, optical system 300 comprises a set of lenses 306, which includes two or more respective lenses. The set of lenses 306 can be generated to form a suitable image 310 of object 308 at a sensor plane 312, at a given object distance (e.g., a hyperfocal distance for lenses 302, 304, 306) and for a desired depth of field. Additionally, the set of lenses 306 can be selected so that a total track length (TTL) of lenses 302, 304 and 306 is less than a desired length. In at least one aspect of the subject disclosure, the TTL is less than 5.5 millimeters (mm). According to particular aspects, the TTL can be less than 5.4 mm. According to other aspects of the subject disclosure, the set of lenses 306 can be selected so that a diameter of image size 310 is equal to or greater than a particular size. For instance, the image size 310 may be greater than or equal to the diagonal of a rectangular image frame for film or image sensor. In at least one aspect, the set of lenses can be selected so that a ratio of TTL to image size is a desired ratio. As one example, the ratio can be about 0.95 or less. Selection of set of lenses 306 can include different numbers of lenses (e.g., two lenses, three lenses, etc.), different types of materials based on respective indices of refraction, Abbe numbers, (see below), or other optical or physical properties, different focal lengths, different effective aperture, and so on, to provide the desired image features discussed above. It should also be appreciated that the set of lenses 306 can be selected according to other features, such as maximum aperture or f-number of the combined lenses 302, 304, 306, a desired image resolution (e.g., in lines per mm, lines per µm, etc.), desired chromatic focal shift, desired relative illumination, desired modulation transfer function (MTF) for a given object distance, desired through focus MTF (TF-MTF) response, desired field curvature and distortion, or desired lateral color, or a combination of the foregoing properties or of other suitable properties.

It should be appreciated that surfaces 302A, 302B, 304A, 304B (as well as other optical surfaces described throughout the subject disclosure, including optical surfaces for systems 400, 1200 and 2000) can be of varying shapes. In one aspect, one or more of the surfaces can be spherical surfaces. In other aspects, one or more of the surfaces can be conic surfaces. In yet other aspects, one or more of the surfaces can be aspheric surfaces, according to a suitable aspheric equation, such as the even aspheric equation:

$$z = \left[ \frac{CY^2}{\{1 + (1 - (1+K)C^2Y^2)^{1/2}\}} \right] + \sum_i (A_i * Y^i), \quad (1)$$

where z is the sag height (in mm) of a line drawn from a point on the aspheric lens surface at a radial distance, Y from the optical axis to the tangential plane of the aspheric surface vertex, C is the curvature of the aspheric lens surface on the optical axis, Y is the radial distance (in mm) from the optical axis, K is the conic constant, and $A_i$ is the $i^{th}$ aspheric coefficient, with the summation over even number i. However, these aspects are not to be construed as limiting the scope of the subject disclosure. Rather, various surfaces can be odd aspheric, or of an aspheric equation comprising even and odd coefficients.

Further to the above, it should be appreciated that lenses 302, 304, 306 of optical system 300 (and optical lenses of various other optical systems provided throughout the subject disclosure, including for instance optical system 400, optical system 1200 and optical system 2000) can be made of various suitable types of transparent material, formed according to various suitable processes for generating an optical quality surface. In one aspect, the lenses 302, 304, 306 can be ground and polished glass, where the glass is selected to have an index of refraction resulting in a desired effective focal length for the combined lenses 302, 304, 306. In another aspect, the lenses can be an optical-quality injected molded plastic (or plastic of optical quality formed by another suitable method), wherein the plastic has an index of refraction suitable to provide the desired effective focal length. In at least one other aspect, the lenses 302, 304, 306 can be etched from a transparent glass, crystalline or other suitable structure (e.g., silicon dioxide—$SiO_2$ wafer) with a lithographic etching process similar to that used to etch semiconductor chips (e.g., solid state memory chip, data processing chip).

Figure 4:
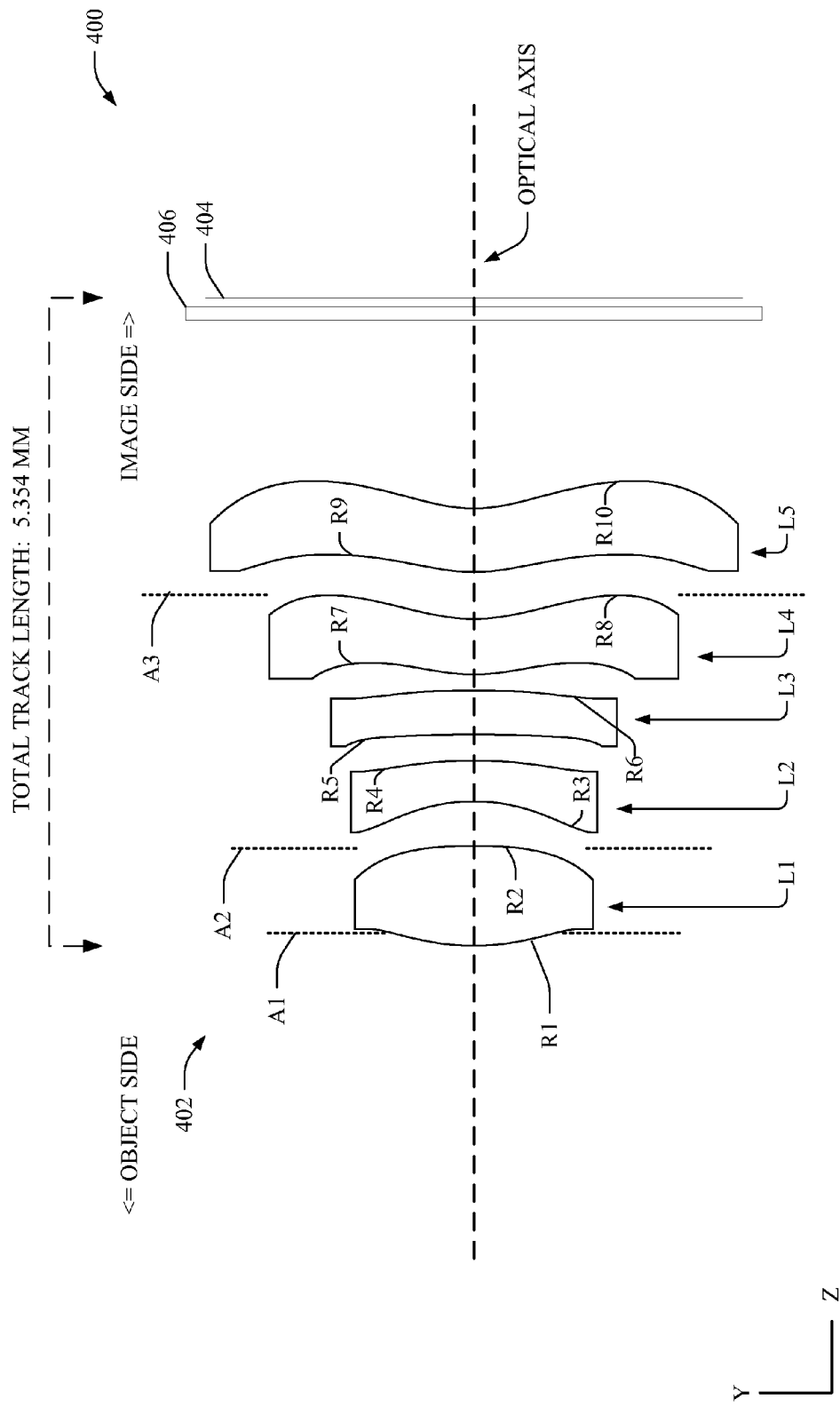
FIG. 4 illustrates a cross-section of a sample fixed focus optical system for enhanced depth of focus (EDoF) according to aspects of the subject disclosure.

FIG. 4 depicts a cross-sectional view of an optical system 400 comprising an arrangement of optical components 402 according to some aspects of the subject disclosure. The arrangement 402 includes a set of optical lenses L1, L2, L3, L4 and L5, and a set of apertures A1, A2, A3, numbered starting from the object side (left of the arrangement 402) to the image side (right side of the arrangement 402). Thus, the first lens from the object side is denoted lens L1, the second from the object side as lens L2, and so on, up through third lens L3, fourth lens L4 and fifth lens L5. With similar numbering, aperture A1 is an aperture stop and is located on the object side just behind the vertex of the front surface (R1) of lens L1. Furthermore, optical arrangement 402 includes two field apertures, aperture A2 between lens L1 and lens L2 and aperture A3 between lens L4 and lens L5. In at least one aspect of the subject disclosure, apertures A2 and A3 are utilized to improve image quality and are not defined as aperture stops. In such aspects, A2 can alternatively be located between lenses L2 and L3, and A3 can alternatively be located between lenses L4 and L5.

Optical system 400 also includes an optical sensor array 404 placed at an in-focus image position for optical arrangement 402, for detecting a real image generated by the optical arrangement 402. The in-focus position is defined as an image distance that corresponds with a peak TF-MTF response for the arrangement 402 (e.g., see FIG. 7, infra). The optical system 400 further comprises a sensor cover plate 406 over the optical sensor array 404.

Lenses L1 through L5 each have two opposed refracting surfaces. A radius of curvature for the respective surfaces is denoted by the letter "R" followed by a surface number, starting with the object side surface of lens L1. Thus, the surfaces in order from object side to image side are object side surface R1 and image side surface R2 of lens L1, object side surface R3 and image side surface R4 of lens L2, object side surface R5 and image side surface R6 of lens L3, object side surface R7 and image side surface R8 of lens L4, and object side surface R9 and image side surface R10 of lens L5. The respective surface identifiers (R1, R2, R3, . . . , R10) are also utilized to represent the radius of curvature for the respective surfaces. Additionally, refractive index n, denotes the refractive index of the lens medium associated with the $i^{th}$ surface, and v_di is the Abbe number of the lens medium associated with the $i^{th}$ surface.

In at least one aspect of the subject disclosure, lens L1 can have positive refractive power, where surfaces R1 and R2 are both convex. R2 can also be concave near the optical axis. Further, lens L1 can have large positive refractive power in some aspects. Lens L2 can have a negative refractive power, where surfaces R3 and R4 are concave and convex respectively, at least near the optical axis. Furthermore, lens L2 can have a meniscus shape in at least some aspects of the subject disclosure. Lens L3 can have a negative refractive power, where surfaces R5 and R6 are concave and convex, respectively. Lens L3 can also have a small negative refractive power according to at least one aspect. Lens L4 can have a positive refractive power, where surfaces R7 and R8 are convex and concave respectively, at least near the optical axis. In one aspect, lens L4 can have a small positive refractive power. In an alternative embodiment, lens L4 can have a small negative refractive power. According to one or more other aspects, lens L4 can further have a varying power which is positive at the optical axis and is decreasing negatively with radial distance from the optical axis. The lens, L5, has a negative refractive power, where surfaces R9 and R10 are, respectively, convex and concave. Lens L5 can also have a small positive refractive power. In some aspects, lens L5 can have varying power which is negative near the optical axis and increases in refractive power positively with radial distance from the optical axis.

According to one particular aspect of the subject disclosure, at least one surface of lenses L1, L2, L3, L4 and L5 has an aspheric shape (e.g., as defined by even aspheric equation (1), at FIG. 3, supra). In at least one other aspect, both surfaces of each of the lenses L1, L2, L3, L4 and L5 have an aspheric shape. In the latter aspect, optical arrangement 402 can potentially achieve a bright image while mitigating aberration with looser tolerances to the optical system (e.g., lens position, radius of curvature). According to various aspects, the lenses L1, L2, L3, L4 and L5 can be made of plastic (e.g., F52R, or OKP4HT, or another suitable plastic having similar refractive index and Abbe number, or a suitable combination thereof). In one specific aspect, lenses L1, L4 and L5 are made of one plastic (e.g., F52R) while lenses L2 and L3 are made of a different plastic (e.g., OKP4HT). It should be appreciated, however, that in other aspects the lenses can be of other materials having similar Abbe numbers or refractive indices instead.

Further to the above, optical arrangement 402 can have a TTL of under 5.5 mm. Particularly, in at least one embodiment, the TTL is about 5.354 mm. Moreover, optical arrangement 402 can produce an image size at the image plane that is greater than about 6.0 mm. Particularly, in at least one embodiment, the image size is about 6.028 mm. Furthermore, the optical arrangement 402 can have an f-number of about 2.4, and according to one particular embodiment, a ratio of TTL to image size of about 0.888.

According to one specific aspect of the subject disclosure, a prescription for the respective lenses L1, L2, L3, L4 and L5 is provided in Tables 1-4, below. Table 1 lists general lens data for the respective lenses, and Table 2 lists surface data including radius of curvature (R) (in mm) near the optical axis, distance between surfaces, diameter of the respective lenses, and material of the respective lenses. Furthermore, Table 3 provides aspheric constants A, for i=2, 4, 6, 8, 10, 12, 14, 16 of equation (1), supra, for aspheric surfaces of Table 2, where the index "i" is denoted by "r" (e.g., as generated in the optical design software program ZEMAX, available from ZEMAX Development Corporation). Table 4 provides refractive index n, of the $i^{th}$ lens for a set of wavelengths.

Figure 5:
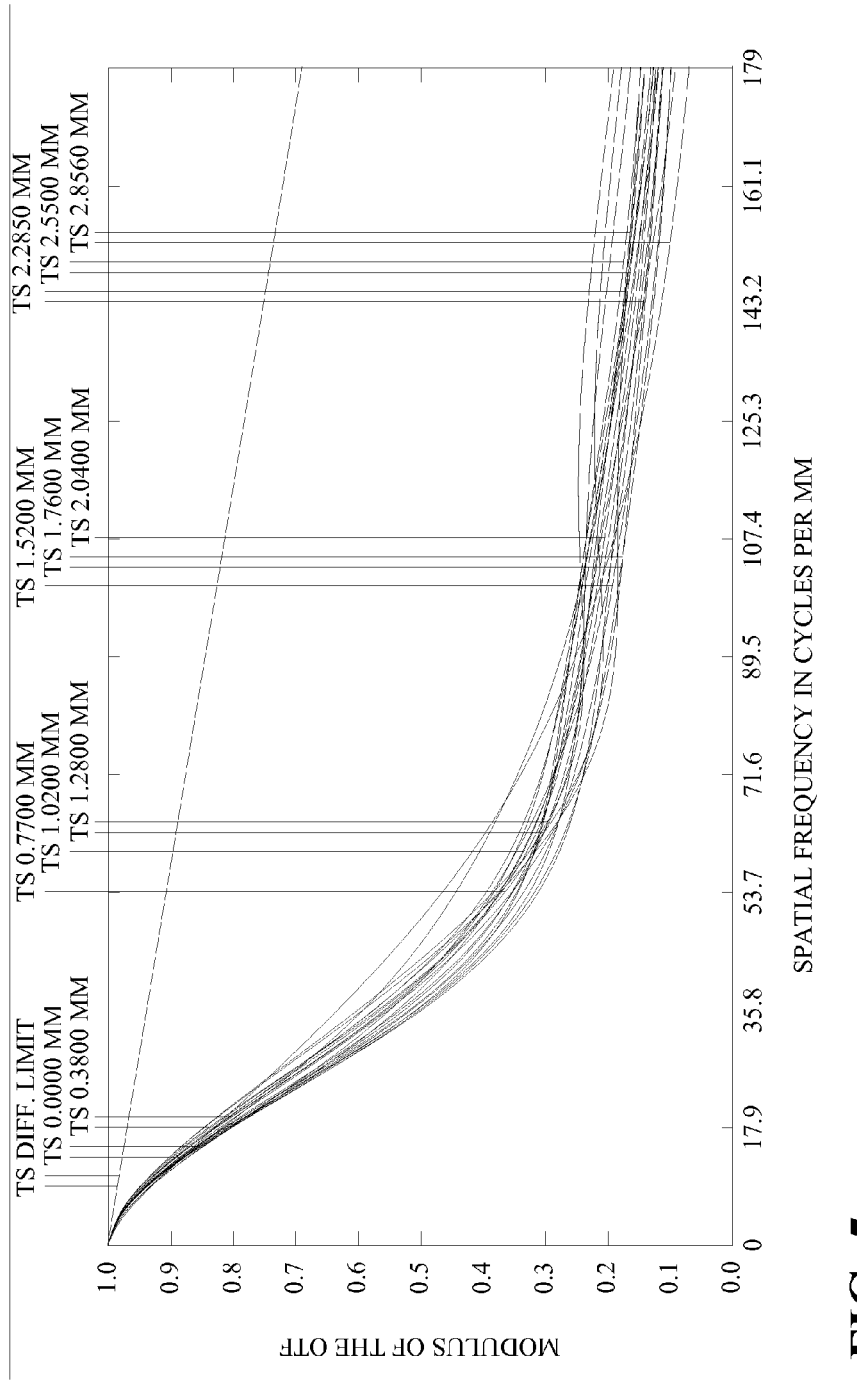
FIG. 5 illustrates a modulation transfer function (MTF) response for the fixed focus optical system for an object distance (OD) of 350 millimeters (mm).
Figure 6:
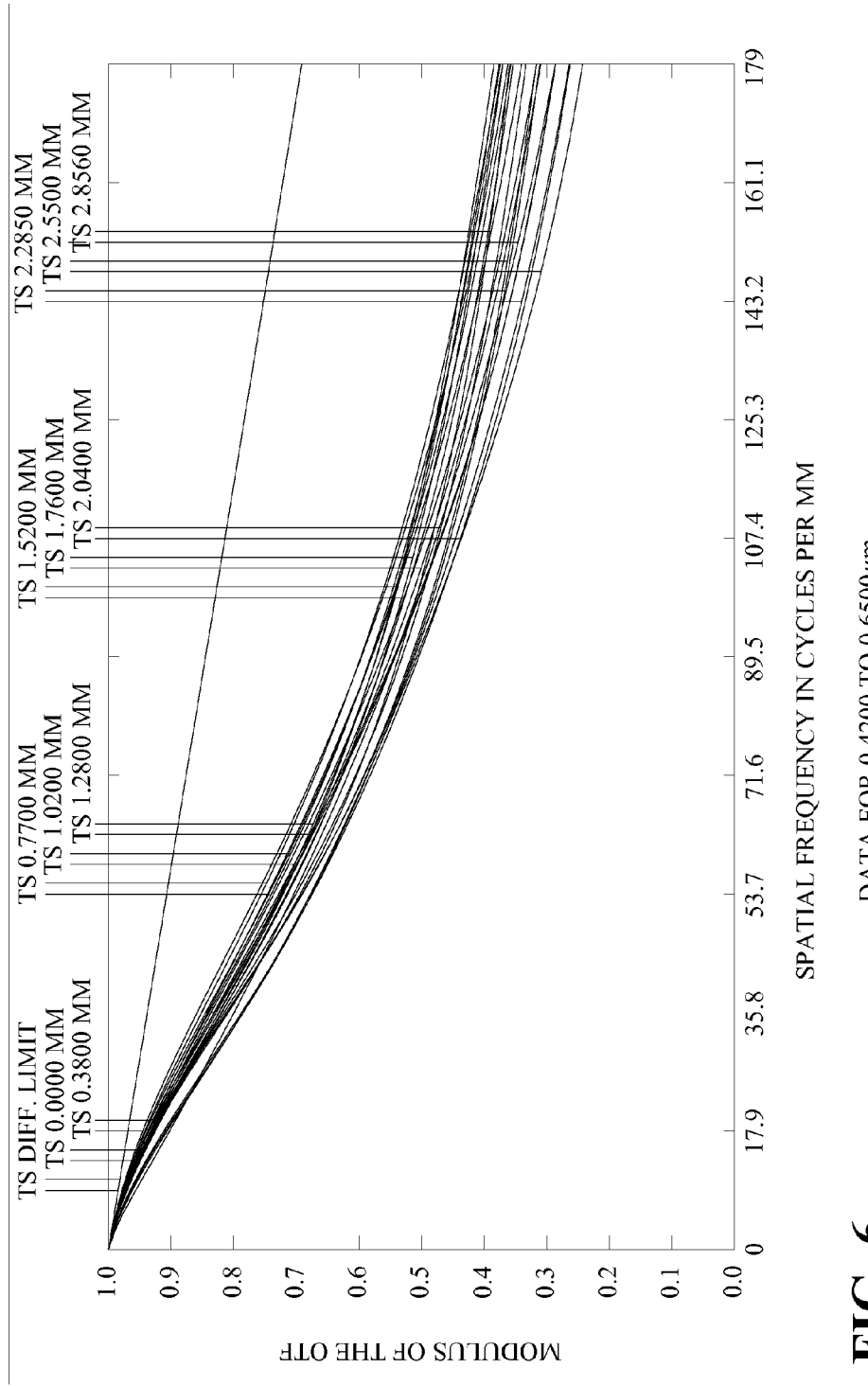
FIG. 6 depicts a MTF response for the fixed focus optical system with an OD of 1000 mm according to one or more disclosed aspects.
Figure 7:
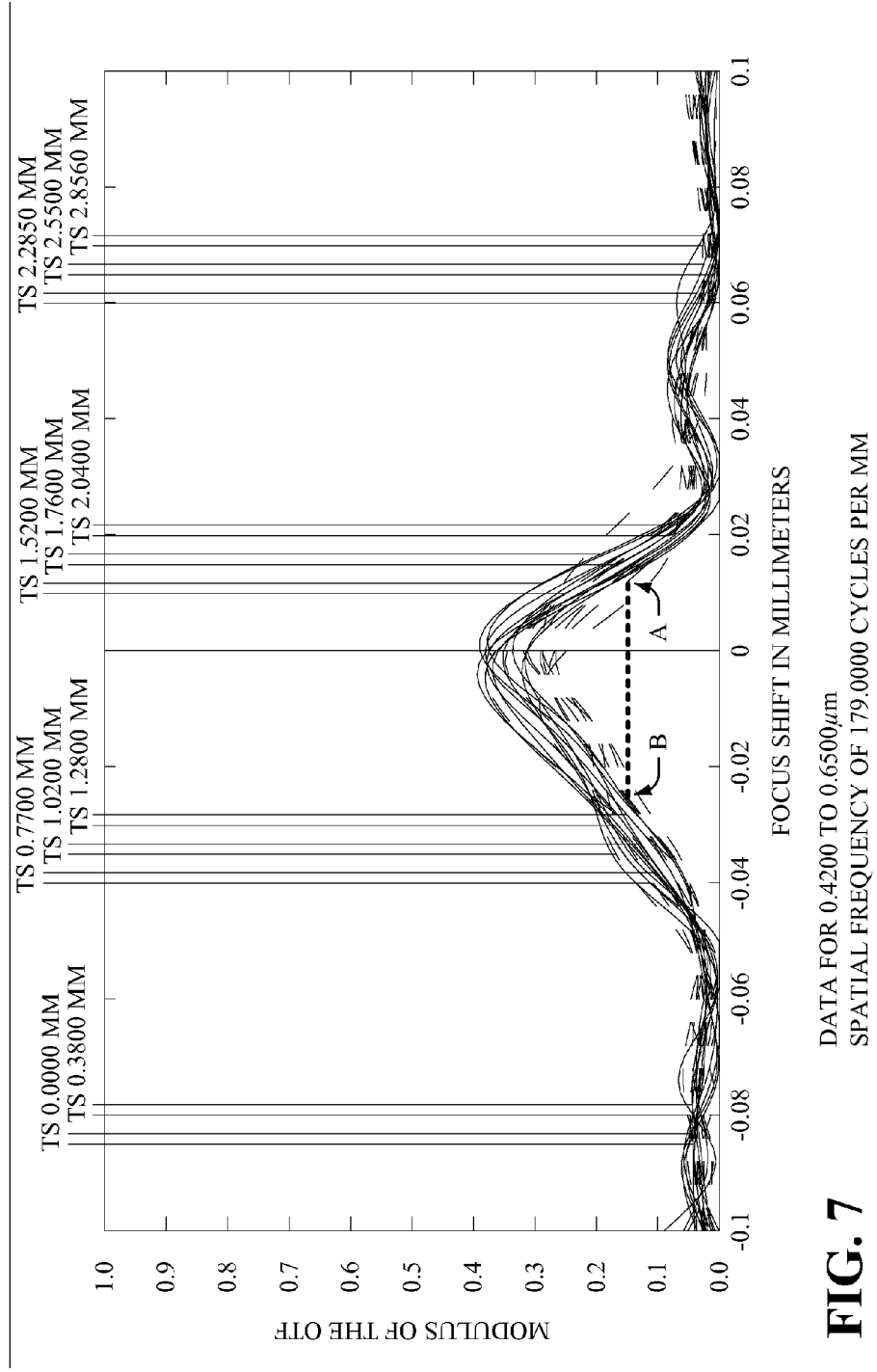
FIG. 7 illustrates a through focus MTF (TF-MTF) response for positive and negative focal shifts for the fixed focus optical system according to other aspects.

FIGS. 5-7 depict respective MTF responses of optical configuration 402 of FIG. 4, supra. MTF is a common metric for measuring spatial resolution of an image. For instance, MTF can provide a quantitative estimate of resolvable contrast of a lens system at various spatial frequencies. MTF can further be measured or calculated at different light wavelengths, object distances or field angles. To this end, FIG. 5 depicts an MTF response for optical arrangement 402 with an OD of 350 mm and FIG. 6 depicts an MTF response for optical arrangement 402 with an OD of 1000 mm.

TABLE 1

General Properties for Optical System 400
(Optical Properties defined in Optical Design Software Zemax)

| | |
|---|---|
| Surfaces (including apertures) | 16 |
| Stops | 1 |
| System Aperture | Float by stop size = 0.92 |
| Apodization | Uniform Factor = 0.00000E+000 |
| Temperature (C.) | 2.00000E+001 |
| Pressure (ATM) | 1.00000E+000 |
| Effective Focal Length | 4.445386 (in air at system temp & pressure) |
| Effective Focal Length | 4.445386 (in image space) |
| Back Focal Length | 0.87 |
| TTL | 5.354161 |
| Image Space F/# | 2.41597 |
| Paraxial Working F/# | 2.431756 |
| Working F/# | 2.398221 |
| Image Space NA | 0.0009199996 |
| Stop Radius | 0.92 |
| Paraxial Image Height | 2.96 |
| Paraxial Magnification | −0.004474432 |
| Entrance Pupil Diameter | 1.84 |
| Entrance Pupil Position | −3.007608 |
| Field Type | Real Image height in mm |
| Maximum Radial Field | 2.96 |
| Primary Wavelength | 0.546 μm |
| Lens Units | Mm |
| Angular Magnification | 1.460293 |

TABLE 2

Surface Data for Lens Elements for Optical System 400

| Surface | Type | Radius (mm) | Thickness (mm) | Medium | Diameter (mm) |
|---|---|---|---|---|---|
| OBJ | Standard | Infinity | 1000 | | 1317.113 |
| A1 | Standard | Infinity | −0.12 | | 1.84 |
| R1 | Even_Asph | 2.280893 | 0.948421 | F52R-T | 2 |
| R2 | Even_Asph | −5.08535 | −0.046011 | | 2.28 |
| A2 | Standard | Infinity | 0.5 | | 2.283346 |
| R3 | Even_Asph | −1.74946 | 0.390373 | OKP4-HT-T | 2.28 |
| R4 | Even_Asph | −4.10089 | 0.195275 | | 2.4 |
| R5 | Even_Asph | −22.1495 | 0.426044 | OKP4-HT-T | 2.5 |
| R6 | Even_Asph | −78.3411 | 0.148015 | | 2.8 |
| R7 | Even_Asph | 1.698245 | 0.555457 | F52R-T | 3.14 |
| R8 | Even_Asph | 1.659244 | 0.256093 | | 3.96 |
| A3 | Standard | Infinity | 0.2 | | 4.233067 |
| R9 | Even_Asph | 1.609059 | 0.621375 | F52R-T | 4.56 |
| R10 | Even_Asph | 1.345314 | 0.75912 | | 5.12 |
| 14 | Standard | Infinity | 0.3 | 1.5231, 55.0000 | 6.1 |
| 15 | Standard | Infinity | 0.1 | | 6.1 |
| IMA | Standard | Infinity | | | 6.027536 |

| Surface | Conic | Note |
|---|---|---|
| OBJ | 0 | |
| A1 | 0 | stop1 |
| R1 | −0.4421614 | L1-1 |
| R2 | 0 | L1-2 |
| A2 | 0 | |
| R3 | −15.3128 | L2-1 |
| R4 | −3.422104 | L2-2 |
| R5 | 0 | L3-1 |
| R6 | 0 | L3-2 |
| R7 | −8.615312 | L4-1 |
| R8 | −7.049131 | L4-2 |
| A3 | 0 | |
| R9 | −9.54761 | L5-1 |
| R10 | −6.824212 | L5-2 |
| 14 | 0 | Ir cut-off (D263T) |
| 15 | 0 | |
| IMA | | |

TABLE 3

Aspheric Coefficients for Lenses L1, L2, L3, L4, L5 of Optical System 400

| Surface | | |
|---|---|---|
| Surface | R1 | |
| | Coeff on r2 | 0 |
| | Coeff on r4 | −0.012260523 |
| | Coeff on r6 | −0.089272446 |
| | Coeff on r8 | 0.22155645 |
| | Coeff on r10 | −0.44332151 |
| | Coeff on r12 | 0.44846665 |
| | Coeff on r14 | −0.23926085 |
| | Coeff on r16 | 0.047583881 |
| Surface | R2 | |
| | Coeff on r2 | 0 |
| | Coeff on r4 | −0.34057177 |
| | Coeff on r6 | 0.5411053 |
| | Coeff on r8 | −0.73604494 |
| | Coeff on r10 | 0.87059671 |
| | Coeff on r12 | −0.64516806 |
| | Coeff on r14 | 0.26060515 |
| | Coeff on r16 | −0.043906093 |
| Surface | R3 | |
| | Coeff on r2 | 0 |
| | Coeff on r4 | −0.34057177 |
| | Coeff on r6 | 0.5411053 |
| | Coeff on r8 | −0.73604494 |
| | Coeff on r10 | 0.87059671 |
| | Coeff on r12 | −0.64516806 |
| | Coeff on r14 | 0.26060515 |
| | Coeff on r16 | −0.043906093 |
| Surface | R4 | |
| | Coeff on r2 | 0 |
| | Coeff on r4 | 0.002642919 |
| | Coeff on r6 | 0.010719539 |
| | Coeff on r8 | 0.011596397 |
| | Coeff on r10 | −0.000135105 |
| | Coeff on r12 | 0 |
| | Coeff on r14 | 0 |
| | Coeff on r16 | 0 |
| Surface | R5 | |
| | Coeff on r2 | 0 |
| | Coeff on r4 | 0.005466055 |
| | Coeff on r6 | −0.002654784 |
| | Coeff on r8 | 0.001667402 |
| | Coeff on r10 | −0.006418908 |
| | Coeff on r12 | 0 |
| | Coeff on r14 | 0 |
| | Coeff on r16 | 0 |
| Surface | R6 | |
| | Coeff on r2 | 0 |
| | Coeff on r4 | −0.20722482 |
| | Coeff on r6 | 0.33421909 |
| | Coeff on r8 | −0.3311249 |
| | Coeff on r10 | 0.24770243 |
| | Coeff on r12 | −0.12399943 |
| | Coeff on r14 | 0.03550344 |
| | Coeff on r16 | −0.004328668 |

TABLE 3-continued

Aspheric Coefficients for Lenses L1, L2, L3, L4, L5 of Optical System 400

| Surface | | |
|---|---|---|
| Surface | R7 | |
| | Coeff on r2 | 0 |
| | Coeff on r4 | −0.14478597 |
| | Coeff on r6 | 0.077181259 |
| | Coeff on r8 | −0.034104792 |
| | Coeff on r10 | 0.006380554 |
| | Coeff on r12 | 0.000878439 |
| | Coeff on r14 | −0.000377498 |
| | Coeff on r16 | 0 |
| Surface | R8 | |
| | Coeff on r2 | 0 |
| | Coeff on r4 | −0.046312891 |
| | Coeff on r6 | 0.010526593 |
| | Coeff on r8 | −0.002502719 |
| | Coeff on r10 | −0.000118555 |
| | Coeff on r12 | 0.000103906 |
| | Coeff on r14 | −9.19E−06 |
| | Coeff on r16 | 0 |
| Surface | R9 | |
| | Coeff on r2 | 0 |
| | Coeff on r4 | −0.080956156 |
| | Coeff on r6 | 0.027573871 |
| | Coeff on r8 | −0.002526396 |
| | Coeff on r10 | −0.001138585 |
| | Coeff on r12 | 0.000306014 |
| | Coeff on r14 | −2.11E−05 |
| | Coeff on r16 | 0 |
| Surface | R10 | |
| | Coeff on r2 | 0 |
| | Coeff on r4 | −0.053163892 |
| | Coeff on r6 | 0.012112145 |
| | Coeff on r8 | −0.001630371 |
| | Coeff on r10 | 3.65E−06 |
| | Coeff on r12 | 1.73E−05 |
| | Coeff on r14 | −1.10E−06 |
| | Coeff on r16 | 0 |

TABLE 4

Index of Refraction for Lenses L1, L2, L3, L4, L5 of Optical System 400

| | | | | Index (for given wavelength in μm) | | | | |
|---|---|---|---|---|---|---|---|---|
| Surface | Medium | Temp | Pressure | 0.42 | 0.486 | 0.546 | 0.588 | 0.656 |
| L1 | F52R-T | 20 | 1 | 1.5487 | 1.5412 | 1.5368 | 1.5344 | 1.5316 |
| L2 | OKP4-HT-T | 20 | 1 | 1.6762 | 1.6519 | 1.6387 | 1.6323 | 1.6247 |
| L3 | OKP4-HT-T | 20 | 1 | 1.6762 | 1.6519 | 1.6387 | 1.6323 | 1.6247 |
| L4 | F52R-T | 20 | 1 | 1.5487 | 1.5412 | 1.5368 | 1.5344 | 1.5316 |
| L5 | F52R-T | 20 | 1 | 1.5487 | 1.5412 | 1.5368 | 1.5344 | 1.5316 |

For the respective ODs, the MTF at a given field angle tends to drop from a maximum at 1.0 (resolving at full contrast at a given spatial frequency) to lower values, indicating a general loss of ability to resolve finer details (e.g., details with higher spatial frequency components). An MTF with shallower slopes will correspond to an image that appears sharper, or more in focus compared to an image with MTF values that drop off more rapidly. The MTF responses of FIGS. 5 and 6 plot polychromatic MTF, where each line represents the MTF from an object at the requisite OD at different field angles. Accordingly, the MTF values comprise several different wavelengths calculated independently for a system and added together with a weighting factor. In addition, the weighted sum of the different wavelengths is normalized so that polychromatic MTF is still equal to one when spatial frequency is equal to zero. Wavelengths employed for FIGS. 5-7 used to calculate respective MTF responses are listed in Table 5. Although many combinations of wavelengths and weighting factors could be utilized, it is common practice to choose a set of wavelengths that adequately span a desired image sensor sensitivity range and have weighting factors that correspond well to either the sensor wavelength response or possibly the wavelength response of the human eye. For example, in one embodiment, the weights of Table 5 could be made equal (e.g., 1). In another embodiment, fewer wavelengths at about 486, 588 and 656 nanometers (nm) can be given roughly equal weights to approximate a response in the visible spectrum. Other combinations known to one of skill in the art can also be used.

As shown by FIG. 5, the MTF for optical arrangement 402 with an OD of 350 mm is above 0.5 for spatial frequencies up to about 36 cycles per mm, and drops below 0.3 for spatial frequencies above about 55 cycles per mm. At high spatial frequency of about 180 cycles per mm, MTF is between about 0.1 and about 0.2 for the field angles sampled by the MTF graph. In contrast, FIG. 6 shows that image resolution increases significantly for optical arrangement 402 with an OD of 1000 mm. Particularly, the MTF for OD of 1000 mm falls off more slowly with spatial frequency. As depicted for FIG. 6, the MTF remains above 0.5 for spatial frequencies up to about 95, and remains above 0.3 for high spatial frequencies at most field angles. Accordingly, at 1000 mm OD optical arrangement can provide a particularly high resolution image.

Another useful form of MTF is TF-MTF, depicted at FIG. 7. Specifically, FIG. 7 depicts TF-MTF for optical arrangement 402. TF-MTF is a plot of modulation transfer function values versus focus shift at specified spatial frequencies. Image distance for FIG. 7 is defined as a distance away from the image plane (e.g., where sensor 404 can be positioned) of the optical system (400). TF-MTF is a polychromatic MTF utilizing the wavelengths and weights listed in Table 5. In some aspects of the subject disclosure, image distance=0 can correspond to an image focal plane when the object is at a hyperfocal distance. Positive focal shifts to the right of image distance=0 correspond to larger object distances (farther from optical arrangement 402) than the hyperfocal distance, and negative focal shifts to the left of image distance=0 correspond to smaller object distances (closer to optical arrangement 402) than the hyperfocal distance. Additionally, an area under the TF-MTF curve for a minimum TF-MTF value (e.g., 0.15, 0.1) indicates the range of focal shifts (both positive and negative) having at least a minimum image sharpness (that corresponds with the minimum TF-MTF value). Although a higher peak value indicates higher peak image sharpness, the higher peak value can also imply relatively small depth of focus. For variable focus optical systems, this can be preferred as the focus can be adjusted to render objects at varying object distances. For fixed focus optical systems, on the other hand, an extended depth of field is typically desired (especially in the near field) since the optical system cannot be refocused.

As depicted, TF-MTF of FIG. 7 peaks at about 0.39 for several field angles, and remains above 0.15 for a range of positive and negative focal shifts represented by the dashed line ending at points A (positive focal shift of about 13 microns) and B (negative focal shift of about 25 microns). Further, the TF-MTF remains above 0.1 for negative focal shifts up to about 40 microns, and positive focal shifts of at least 15 microns (corresponding to the far field in object space). The negative focal shifts in image space correspond with object distances less than an in focus object distance (the object distance that corresponds with image distance=0), and positive focal shifts in image space correspond with object distances further than this in focus object distance. One significant benefit provided by optical arrangement 402 is the increased MTF for object distances less than the in focus object distance. For a fixed focal length optical arrangement (commonly employed for small electronic devices, such as camera modules employed in cellular phones, flat-screen monitors, hidden surveillance equipment, and so on) that cannot be refocused to obtain a sharp image of near objects (e.g., nearer than one half the hyperfocal distance), the greater the negative focus shifts that maintain an MTF above a threshold level (e.g., 0.15), the greater the EDoF provided by the lens arrangement.

In at least one aspect of the subject disclosure, the TF-MTF of FIG. 7 is plotted for tangential and sagittal rays at a spatial frequency chosen to match a fraction of the Nyquist frequency of image sensor 404. For instance, the spatial frequency could be about one-fourth of the Nyquist frequency, one-half of the Nyquist frequency, or the like. As a particular example, sensor 410 can have a pixel pitch of about 1.4 microns.

TABLE 5

MTF Wavelengths and Weights for FIGS. 5, 6, and 7

| Wavelength | Value (in µm) | Weight |
| --- | --- | --- |
| 1 | 0.420000 | 26.000000 |
| 2 | 0.486000 | 163.00000 |
| 3 | 0.546000 | 324.00000 |
| 4 | 0.588000 | 330.00000 |
| 5 | 0.656000 | 157.00000 |

The lens set embodiments disclosed herein and variants thereof (e.g., optical arrangements 402, 1202 and 2000) can incorporate extended or customized depth of field technologies, such as those disclosed in commonly assigned pending U.S. Patent Application No. 61/001,988, filed Nov. 6, 2007, and 61/002,262, filed Nov. 7, 2007, the contents of which are expressly incorporated by reference herein in their entireties. To this end, the optical arrangements can produce a slightly blurry image with some longitudinal aberrations (including both diffractive and chromatic aberration) that can be corrected using subsequent image processing, such as that disclosed in commonly assigned pending U.S. patent application Ser. No. 11/970,427, filed Jan. 7, 2008, the contents of which are expressly incorporated by reference herein in their entirety.

Figure 8:
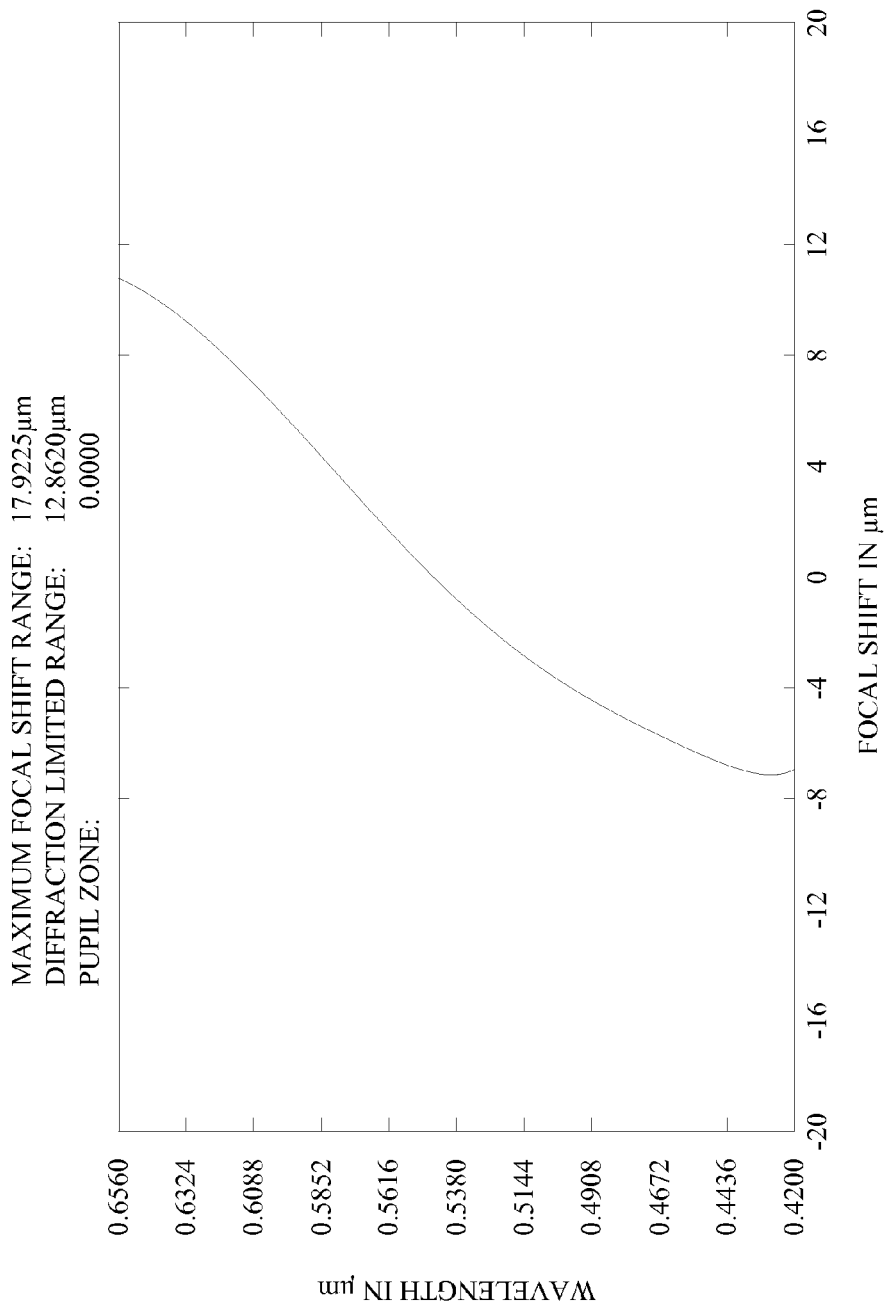
FIG. 8 depicts a graph of chromatic focal shift for the fixed focus optical system based on additional aspects.

FIG. 8 depicts a graph of chromatic focal shift for optical configuration 402. Specifically, FIG. 8 depicts chromatic changes for a range of positive and negative focal shifts. The maximum focal shift range depicted for FIG. 8 is 17.9225 µm, and ranges from about −7 microns for 0.42 µm wavelength light to about 10 microns for 0.65 µm wavelength light. As one of skill in the art will readily discern, the chromatic focal shift is relatively small, despite the small TTL of optical arrangement 402.

Figure 9:
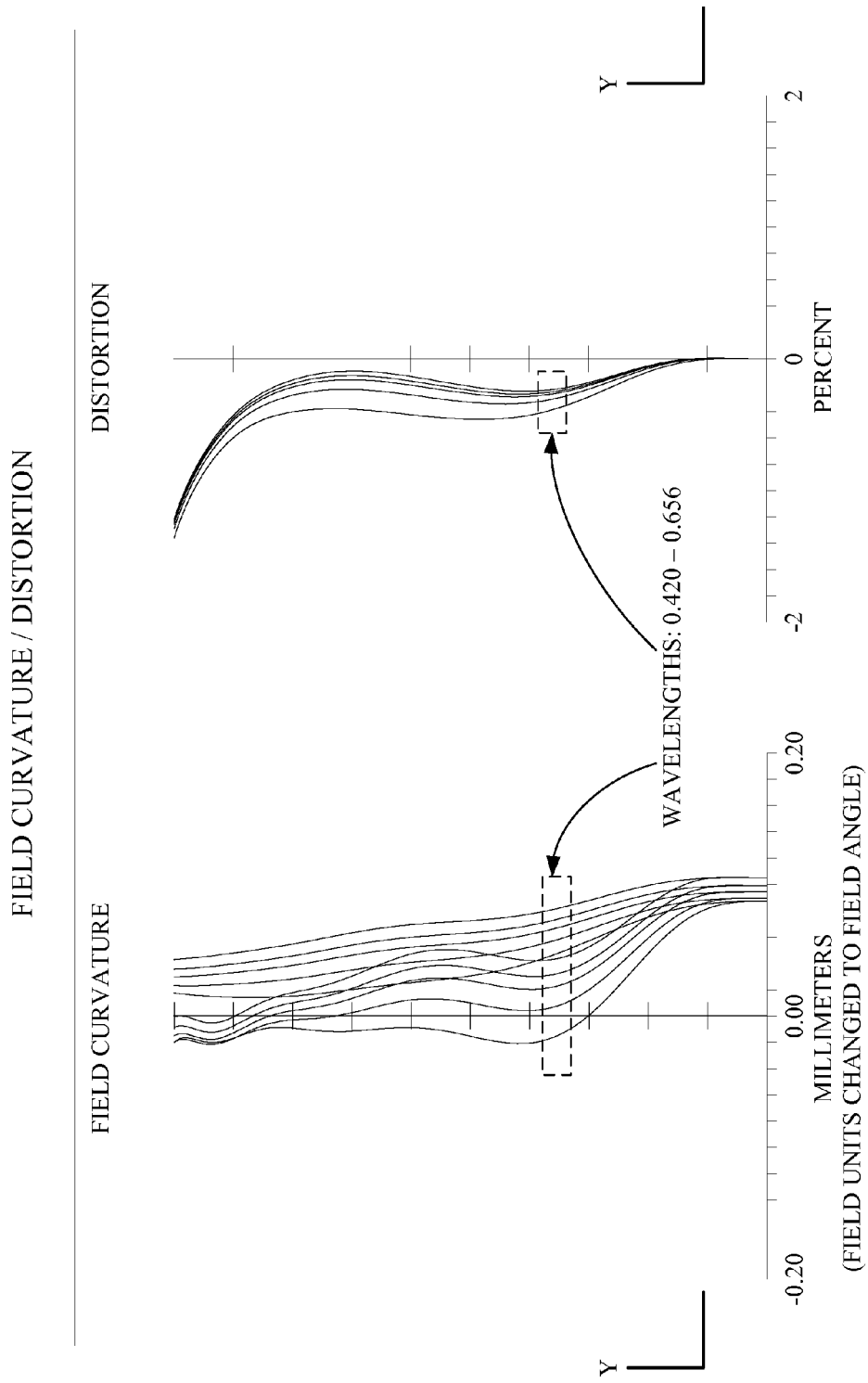
FIG. 9 illustrates a graph of field curvature and distortion for the fixed focus optical system according to still other aspects.

FIG. 9 illustrates a graph of field curvature and distortion for optical configuration 402. Further, the field curvature and distortion values are displayed for several wavelengths. Field curvature is will within the range of positive 20 microns and negative 20 microns, and distortion is well within two and negative two percent. As is clear to one of skill in the art, aberrations are well compensated for by the subject optical arrangement 402.

Figure 10:
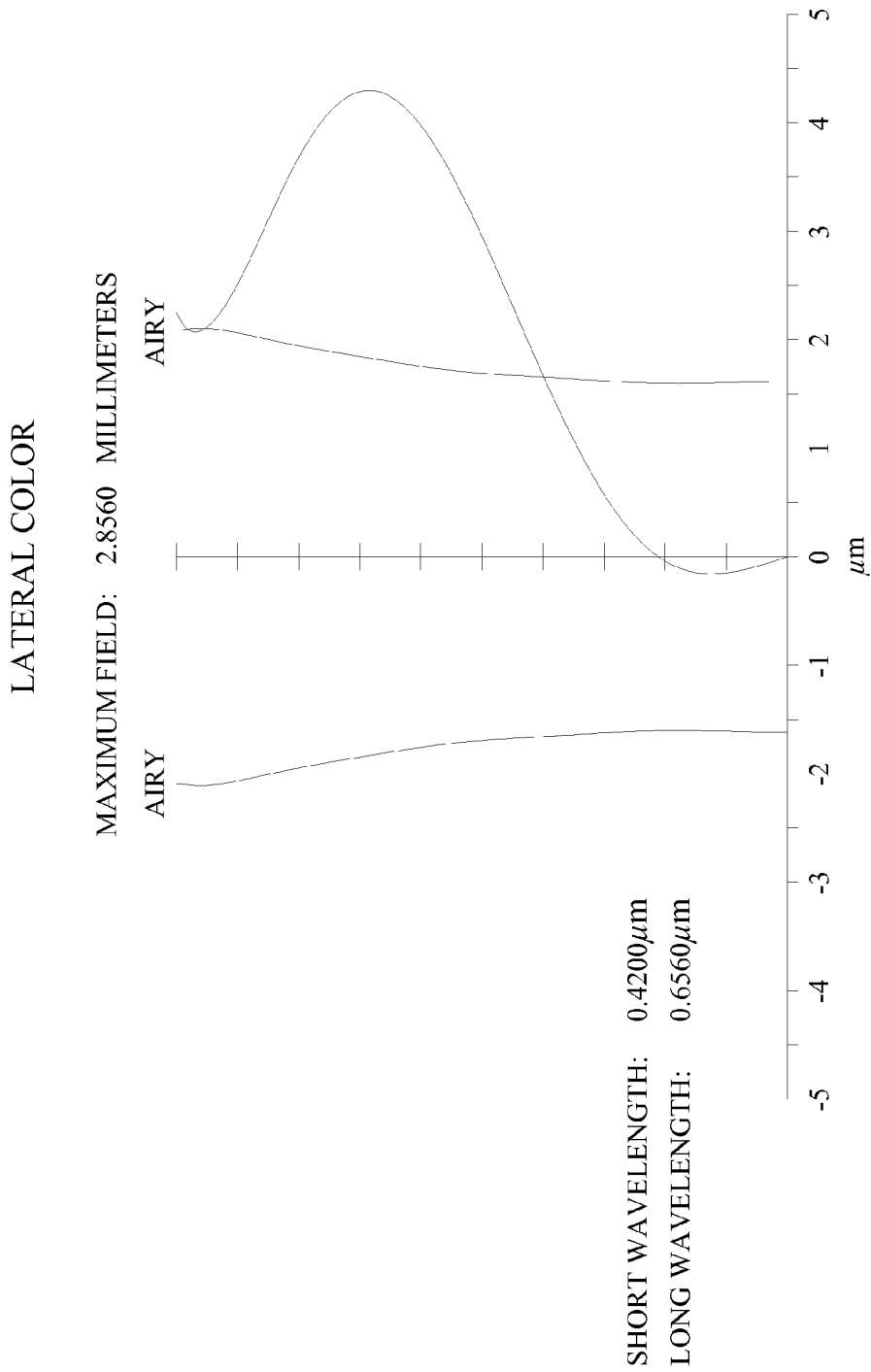
FIG. 10 illustrates a graph of lateral color for the fixed focus optical system of FIG. 4.

FIG. 10 depicts a graph of lateral color for optical arrangement 402. A maximum field for the graph is 2.8560 mm. Additionally, the lateral color curve is over a range of wavelengths from 0.42 µm to 0.6560 µm. The lateral color curve is depicted for airy discs at approximately 1.6 µm and negative 1.6 µm.

Figure 11:
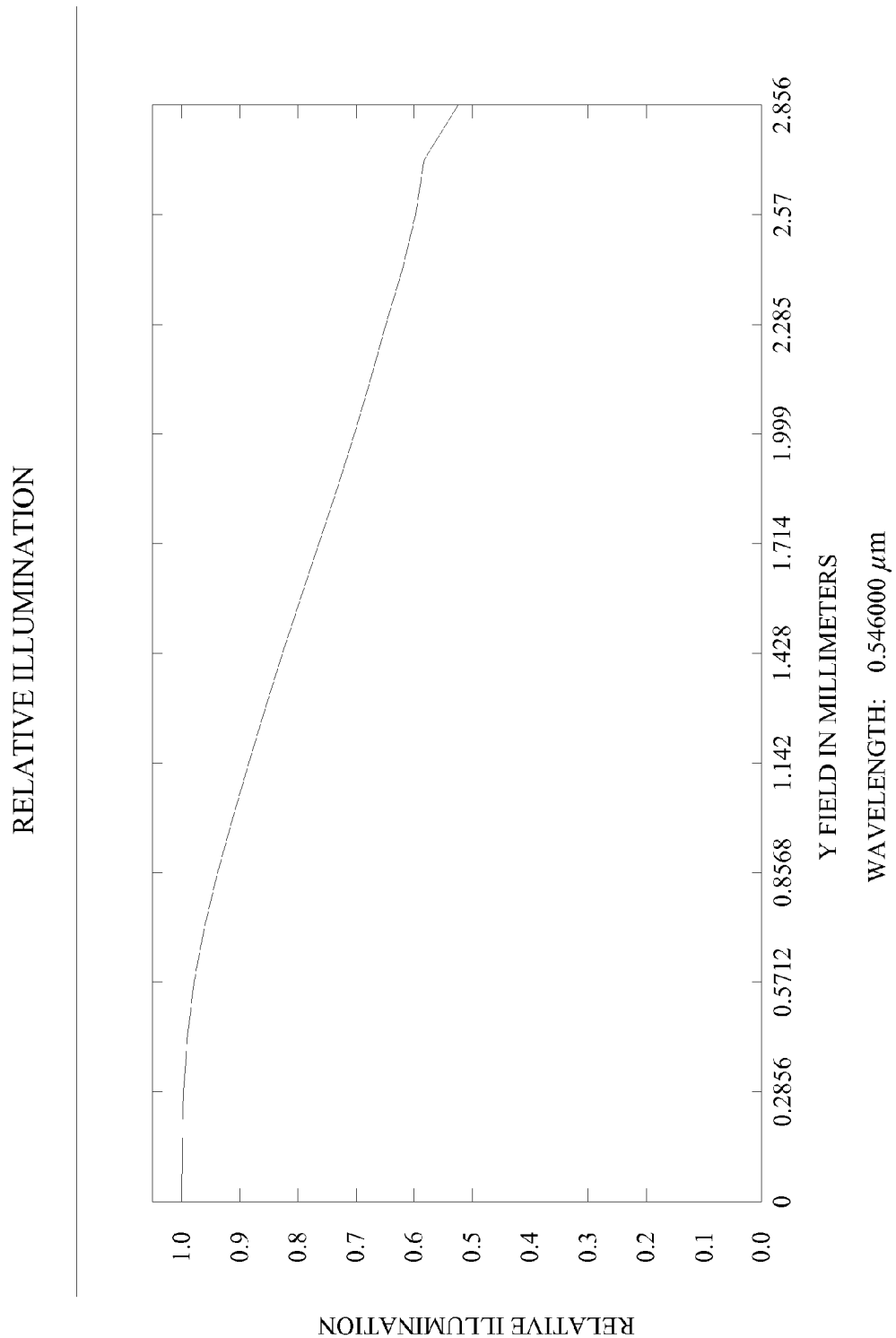
FIG. 11 illustrates a graph of relative illumination for the fixed focus optical system indicative of sensor exposure for the system.

FIG. 11 illustrates a graph of relative illumination for optical arrangement 402. Relative illumination provides an indication of light power incident upon sensor 404 as a function of sensor height. A drop-off in illumination toward image periphery is typical for a lens system. Here, the relative illumination curve shown is normalized at 1.0 for the center of the image and remains above 0.5 at up to 2.856 mm from the image center. This is a suitable image plane illumination for a camera or similar device, such as a camera module of a computer, monitor, display, or other suitable electronic hardware.

Figure 12:
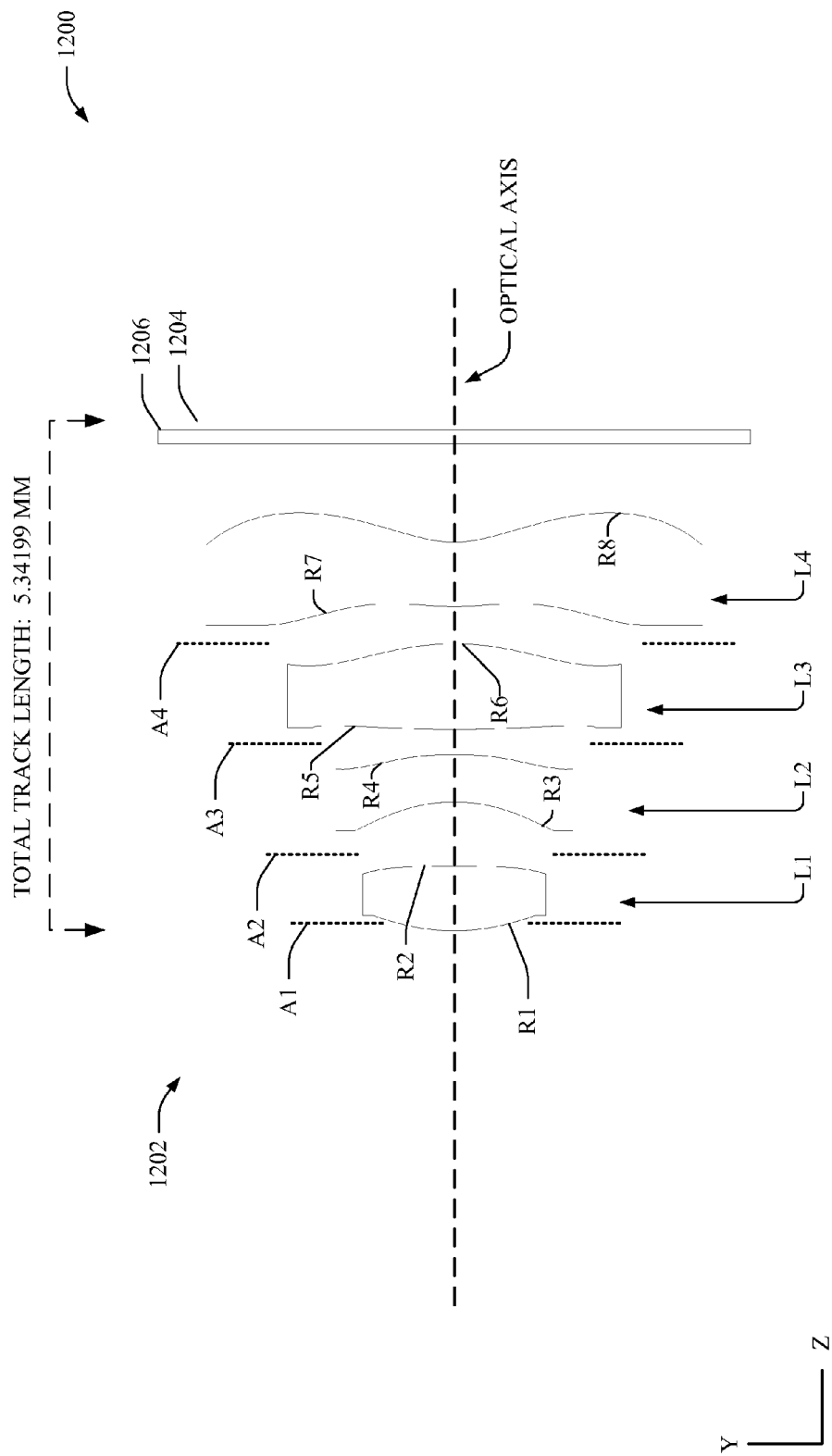
FIG. 12 depicts a cross-section of an additional fixed focus optical system having f-number 2.8 and providing EDoF according to further aspects.

FIG. 12 depicts a cross-sectional view of an alternative optical system 1200 according to further aspects of the subject disclosure. Specifically, optical system 1200 comprises an arrangement of optical components 1202, an optical sensor 1204 at an in focus image position (e.g., an image distance that corresponds with a peak TF-MTF, an image corresponding with a hyperfocal object distance, etc.), and a glass plate 1206 over the optical sensor 1202. The arrangement 1202 includes a set of optical lenses L1, L2, L3, and L4, and a set of apertures A1, A2, A3 and A4. Similar to the numbering described above with respect to FIG. 4, lens numbering and aperture numbering start from the object side and count up to the image side. As depicted, aperture A1 is a field stop or entrance pupil positioned at the object side surface of lens L1. Additionally, aperture A4 can be an exit pupil positioned between lens L3 and lens L4. Apertures A2 and A3 are, in some aspects of the subject disclosure, utilized to improve image quality and are not defined as aperture stops.

Lenses L1 through L4 each have two opposed refracting surfaces. A radius of curvature for the respective surfaces is denoted by the letter "R" followed by a surface number, starting with the object side surface of lens L1, similar to the convention employed for FIG. 4. Thus, the surfaces in order from object side to image side are object side surface R1 and image side surface R2 of lens L1, object side surface R3 and image side surface R4 of lens L2, object side surface R5 and image side surface R6 of lens L3, and object side surface R7 and image side surface R8 of lens L4. The respective surface identifiers (R1, R2, R3, . . . , R8) also denote the radius of curvature for the respective surfaces in the tables below (Tables 6, 7, 8 and 9). Additionally, refractive index n, denotes the refractive index of the lens medium associated with the $i^{th}$ surface, and v_di is the Abbe number of the lens medium associated with the $i^{th}$ surface.

In at least one aspect of the subject disclosure, lens L1 can have positive refractive power, where surfaces R1 and R2 are both convex. R2 can also be concave near the optical axis. Further, lens L1 can have large positive refractive power in some aspects. Lens L2 can have a negative refractive power, where surfaces R3 and R4 are concave and convex respectively, at least near the optical axis. Furthermore, lens L2 can have a meniscus shape in at least some aspects of the subject disclosure. Lens L3 can have a positive refractive power, where surfaces R5 and R6 are both convex, at least near the optical axis. In one aspect, surface R5 can be concave near the optical axis. The lens, L4, has a negative refractive power, where surfaces R7 and R8 are, respectively, convex and concave. Lens L4 can have a small positive refractive power. In some aspects, lens L4 can have varying power which is negative near the optical axis and is increasing positively with radial distance from the optical axis.

According to one particular aspect of the subject disclosure, at least one surface of lenses L1, L2, L3, and L4 has an aspheric shape, as described herein. In at least one other aspect, each surface of lenses L1, L2, L3, and L4 have an aspheric shape. According to various aspects, the lenses L1, L2, L3, and L4 can be made of plastic (e.g., F52R, or OKP4-H, or other suitable plastic with similar Abbe number or refractive index, or a suitable combination thereof). In one specific aspect, lenses L1, L3 and L4 are of plastic F52R while lens L2 is of plastic OKP4-H. It should be appreciated, however, that in other aspects the lenses can be of materials having similar Abbe numbers and refractive indices instead.

Further to the above, optical arrangement 1202 can have a TTL of under 5.5 mm. Particularly, in at least one embodiment, the TTL is about 5.34199 mm. Moreover, optical arrangement 1202 can produce an image size at the image plane that is greater than about 5.71 mm. Particularly, in at least one embodiment, the image size is about 5.780 mm. Furthermore, the optical arrangement 1202 can have an f-number of about 2.8 in at least one embodiment, and according to one or more other embodiments, a ratio of TTL to image size is about 0.92 or less.

According to one specific aspect of the subject disclosure, a prescription for the respective lenses L1, L2, L3, and L4 is provided in Tables 6-9, below. Table 6 lists general lens data for the respective lenses, and Table 7 lists surface data including radius of curvature (R) (in mm) near the optical axis, distance between surfaces, diameter of the respective lenses, and material of the respective lenses. Furthermore, Table 8 provides aspheric constants A, for i=2, 4, 6, 8, 10, 12, 14, 16 of equation (1), supra, for aspheric surfaces of Table 7, where the index "i" is denoted by "r".

TABLE 6

General Optical Properties for Optical System 1200

| | |
|---|---|
| Surfaces (including apertures) | 15 |
| Stops | 1 |
| System Aperture | Float by stop size = 0.75 |
| Apodization | Uniform Factor = 0.00000E+000 |
| Temperature (C.) | 2.30000E+001 |
| Pressure (ATM) | 1.00000E+000 |
| Effective Focal Length | 4.282901 (in air at system temp & pressure) |
| Effective Focal Length | 4.282901 (in image space) |
| Back Focal Length | 1.00 |
| TTL | 5.341989 |
| Image Space F/# | 2.855268 |
| Paraxial Working F/# | 2.864049 |
| Working F/# | 2.864049 |
| Image Space NA | 0.1718431 |
| Object Space NA | 0.0004999999 |
| Stop Radius | 0.75 |
| Paraxial Image Height | 2.875 |
| Paraxial Magnification | −0.002866348 |
| Entrance Pupil Diameter | 1.5 |
| Entrance Pupil Position | 0 |
| Exit Pupil Diameter | 1.107956 |
| Exit Pupil Position | −3.17324 |
| Field Type | Real Image height in mm |
| Maximum Radial Field | 2.875 |
| Primary Wavelength | 0.49 μm |
| Lens Units | Mm |
| Angular Magnification | 1.353847 |

TABLE 7

Surface Data for Lens Elements for Optical System 1200

| Surface | Type | Radius (mm) | Thickness (mm) | Medium | Diameter (mm) |
|---|---|---|---|---|---|
| OBJ | Standard | Infinity | 1500 | | 2020.441 |
| A1 | Standard | Infinity | −0.08 | | 1.5 |
| R1 | Even_Asph | 2.139801 | 0.6776292 | F52R | 1.7 |
| R2 | Even_Asph | −21.04408 | 0.120492 | | 1.92 |
| A2 | Standard | Infinity | 0.55 | | 2.018704 |
| R3 | Even_Asph | −1.846378 | 0.4973513 | OKP4-HT | 2.1 |
| R4 | Even_Asph | −4.044088 | 0.113735 | | 2.48 |
| A3 | Standard | Infinity | 0.15 | | 2.806066 |
| R5 | Even_Asph | 8.793577 | 0.89846 | F52R | 2.98 |
| R6 | Even_Asph | −2.68867 | 0.0014494 | | 3.5 |
| A4 | Standard | Infinity | 0.39 | | 3.895817 |
| R7 | Even_Asph | 3.347471 | 0.6746217 | F52R | 4.32 |
| R8 | Even_Asph | 1.181678 | 1.02675 | | 5.2 |
| 13 | Standard | Infinity | 0.15 | 1.5231, 55.0000 | 6.2 |
| 14 | Standard | Infinity | 0.0915 | | 6.2 |
| IMA | Standard | Infinity | | | 5.780063 |

| Surface | Conic | Note |
|---|---|---|
| OBJ | 0 | |
| A1 | 0 | Stop 1 |
| R1 | −0.7905424 | L1-1 |
| R2 | 0 | L1-2 |
| A2 | 0 | Stop 2 |
| R3 | −10.51698 | L2-1 |

TABLE 7-continued

Surface Data for Lens Elements for Optical System 1200

| | | |
|---|---|---|
| R4 | 0 | L2-2 |
| A3 | 0 | Stop 3 |
| R5 | 21.10483 | L3-1 |
| R6 | 0 | L3-2 |
| A4 | 0 | Stop 4 |
| R7 | −69.51808 | L4-1 |
| R8 | −6.505235 | L4-2 |
| 13 | 0 | CG(D263T) |
| 14 | 0 | |
| IMA | 0 | |

TABLE 8

Aspheric Coefficients for Lenses L1, L2, L3, L4 of Optical System 1200

| Surface | | |
|---|---|---|
| Surface | R1 | |
| | Coeff on r2 | 0 |
| | Coeff on r4 | −0.0017386 |
| | Coeff on r6 | −0.0677615 |
| | Coeff on r8 | 0.20607855 |
| | Coeff on r10 | −0.3805777 |
| | Coeff on r12 | 0.26264287 |
| | Coeff on r14 | −0.1434276 |
| | Coeff on r16 | 0.15029139 |
| Surface | R2 | |
| | Coeff on r2 | 0 |
| | Coeff on r4 | −0.0686313 |
| | Coeff on r6 | 0.07370521 |
| | Coeff on r8 | −0.1620303 |
| | Coeff on r10 | 0.13862227 |
| | Coeff on r12 | −0.1144265 |
| | Coeff on r14 | 0.01382105 |
| | Coeff on r16 | 0.05221345 |
| Surface | R3 | |
| | Coeff on r2 | 0 |
| | Coeff on r4 | −0.3068952 |
| | Coeff on r6 | 0.50879085 |
| | Coeff on r8 | −0.6945951 |
| | Coeff on r10 | 0.74121788 |
| | Coeff on r12 | −0.5069921 |
| | Coeff on r14 | 0.17440581 |
| | Coeff on r16 | −0.0133585 |
| Surface | R4 | |
| | Coeff on r2 | 0 |
| | Coeff on r4 | −0.1400819 |
| | Coeff on r6 | 0.27989335 |
| | Coeff on r8 | −0.2993534 |
| | Coeff on r10 | 0.22764705 |
| | Coeff on r12 | −0.1020427 |
| | Coeff on r14 | 0.02520876 |
| | Coeff on r16 | −0.0028489 |
| Surface | R5 | |
| | Coeff on r2 | 0 |
| | Coeff on r4 | −0.0675807 |
| | Coeff on r6 | 0.0693239 |
| | Coeff on r8 | −0.0374437 |
| | Coeff on r10 | 0.00471701 |
| | Coeff on r12 | 0.00193416 |
| | Coeff on r14 | −8.24E−05 |
| | Coeff on r16 | −0.0001984 |
| Surface | R6 | |
| | Coeff on r2 | 0 |
| | Coeff on r4 | 0.02815084 |
| | Coeff on r6 | 0.01257383 |
| | Coeff on r8 | −0.0030144 |
| | Coeff on r10 | 0.00019697 |
| | Coeff on r12 | 0.00011514 |
| | Coeff on r14 | −2.36E−05 |
| | Coeff on r16 | −2.00E−06 |
| Surface | R7 | |
| | Coeff on r2 | 0 |
| | Coeff on r4 | −0.116754 |
| | Coeff on r6 | 0.04677919 |
| | Coeff on r8 | −0.0113413 |
| | Coeff on r10 | 0.00220151 |

TABLE 8-continued

Aspheric Coefficients for Lenses L1, L2, L3, L4 of Optical System 1200

| | | |
|---|---|---|
| | Coeff on r12 | −0.0002387 |
| | Coeff on r14 | 1.47E−06 |
| | Coeff on r16 | 1.24E−06 |
| Surface | R8 | |
| | Coeff on r2 | 0 |
| | Coeff on r4 | −0.0483206 |
| | Coeff on r6 | 0.0107828 |
| | Coeff on r8 | −0.0014496 |
| | Coeff on r10 | −1.85E−05 |
| | Coeff on r12 | 3.06E−05 |
| | Coeff on r14 | −3.52E−06 |
| | Coeff on r16 | 1.29E−07 |

Figure 13:
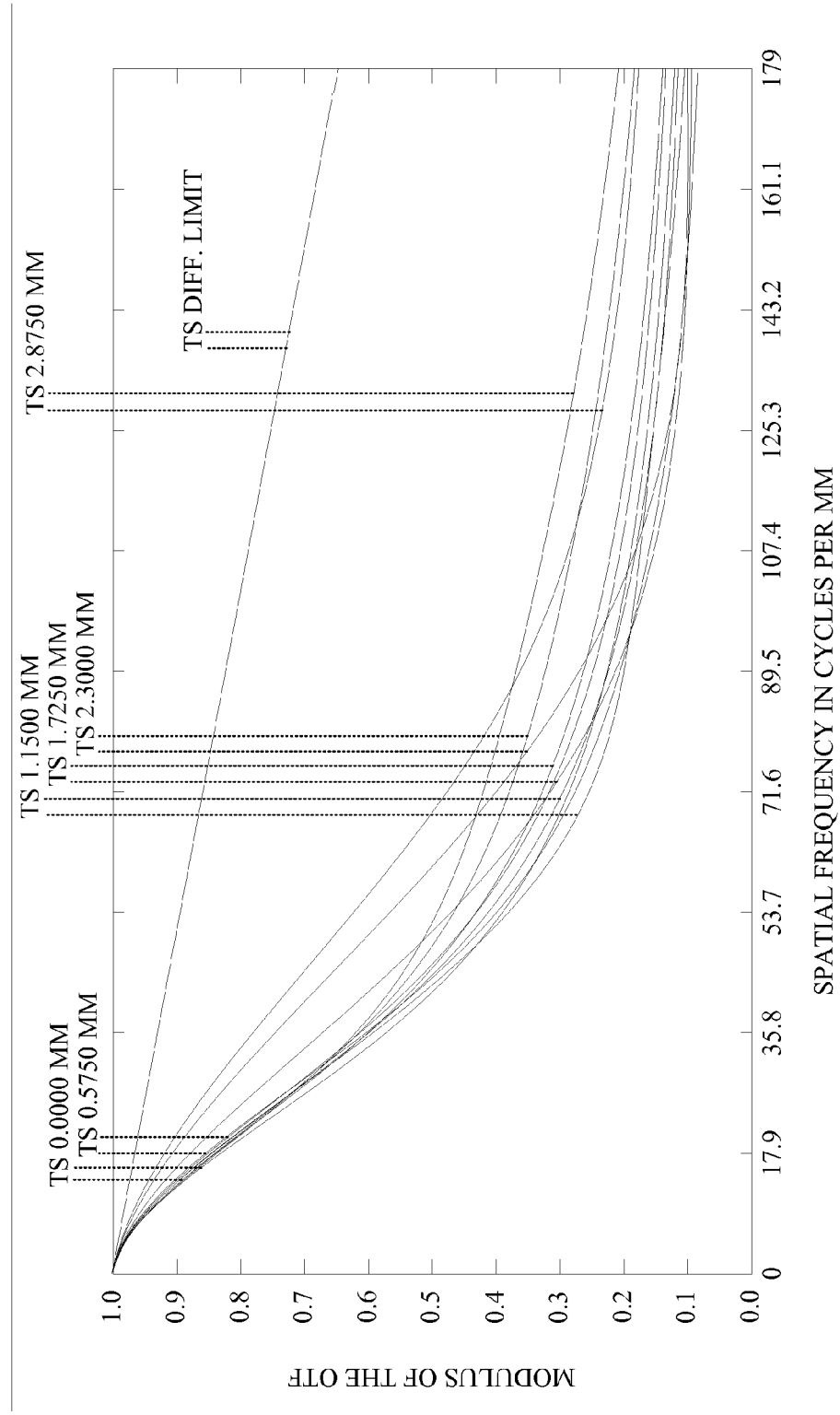
FIG. 13 depicts a graph of MTF response for the additional fixed focus optical system with 350 mm OD.
Figure 14:
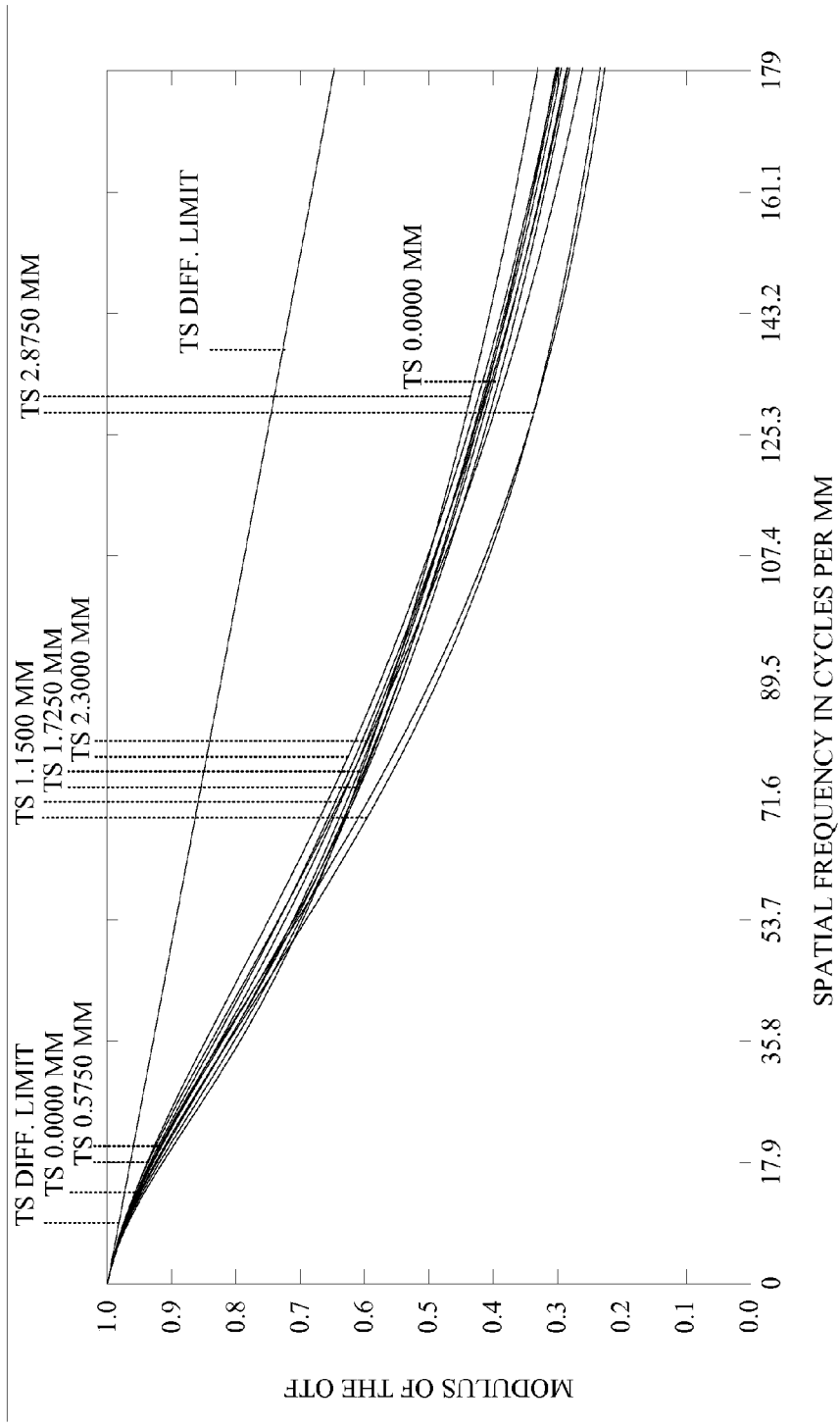
FIG. 14 illustrates a graph of MTF response for the fixed focus optical system of FIG. 12 for an OD of 1000 mm.
Figure 15:
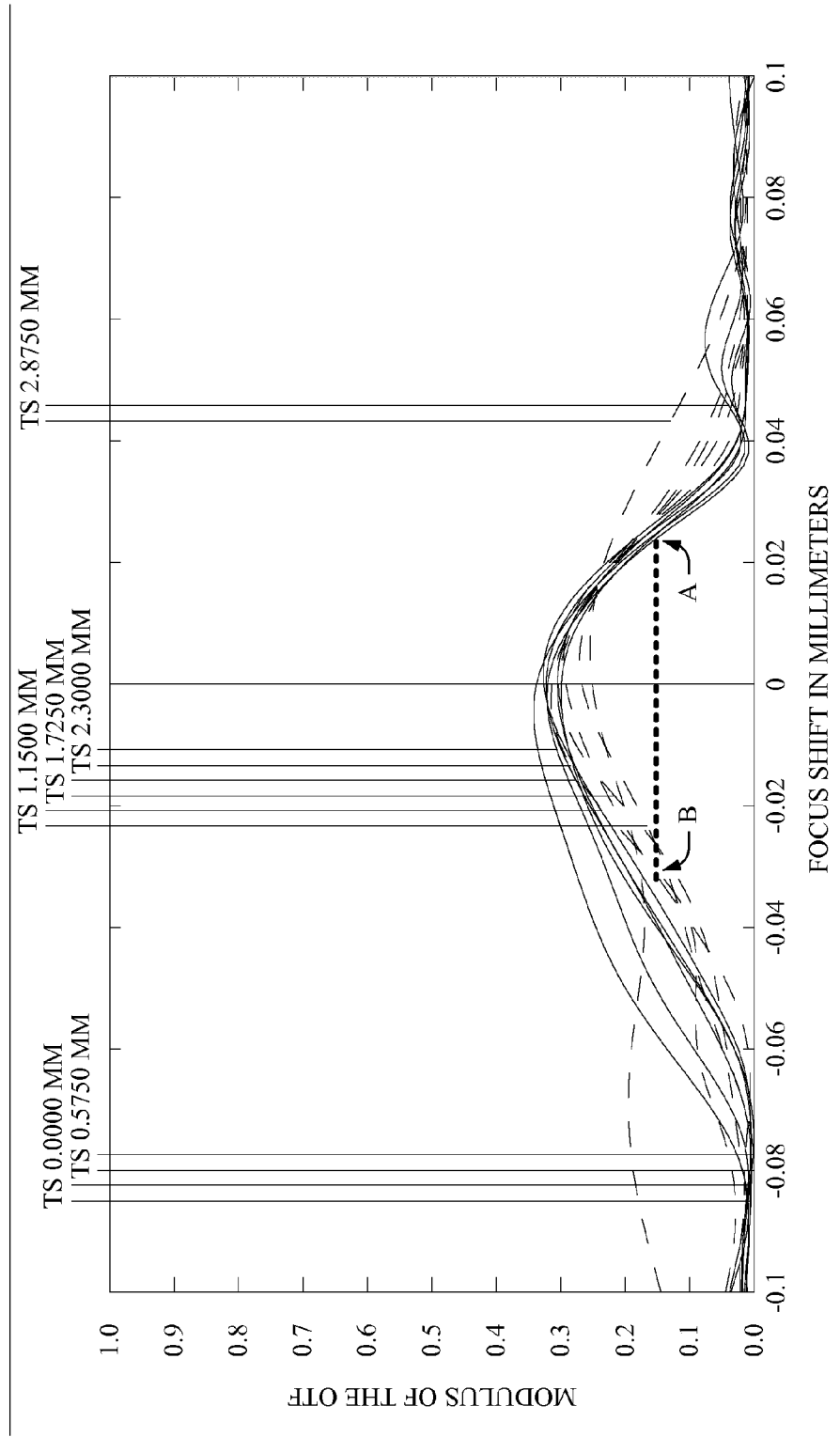
FIG. 15 depicts a graph of TF-MTF for a range of positive and negative focal shifts for the additional fixed focus optical system.

FIGS. 13-19 depict various optical responses for optical arrangement 1202. Specifically, FIG. 13 illustrates polychromatic diffraction MTF for an object at 350 mm OD. MTF for optical arrangement 1202 and OD 350 mm remains above 0.5 for spatial frequencies up to about 40 cycles per mm for most field angles, and remains above 0.3 for spatial frequencies up to about 70 cycles per mm. For high spatial resolution (~180 cycles per mm), the MTF is between about 0.1 and about 0.2 for the sampled field angles. For OD of 1000 mm, FIG. 14 shows that the polychromatic diffraction MTF decays more slowly than for 350 mm. Particularly, the MTF remains above 0.5 for spatial frequencies up to about 90 cycles per mm at least for small to moderate field angles and above 0.3 even at high spatial resolution for most field angles. FIG. 15 is a graph of TF-MTF for optical arrangement 1202. As depicted at FIG. 15, the MTF peaks at about 0.3 for image distance=0 (the in focus object distance, which can be, e.g., the hyperfocal distance) and remains above about 0.15 for a range of positive and negative focal shifts depicted by the bold and dashed line ranging from positive focal shifts of about 25 microns at point A (which corresponds to infinity in object space) to negative focal shifts of about 35 microns, at point B. Additionally, the TF-MTF remains above 0.1 for negative focal shifts up to about 40 microns. This asymmetry in MTF decay results in EDoF for closer object distances as compared with traditional optical systems. The MTF curves of FIG. 13 and FIG. 14, as well as MTF curve of FIG. 15, employ wavelengths and weights as listed in Table 9, below. As described herein, the wavelengths and weights are not exclusive, but are intended to be merely representative of an optical spectrum sensitive to optical sensor 1204.

Figure 16:
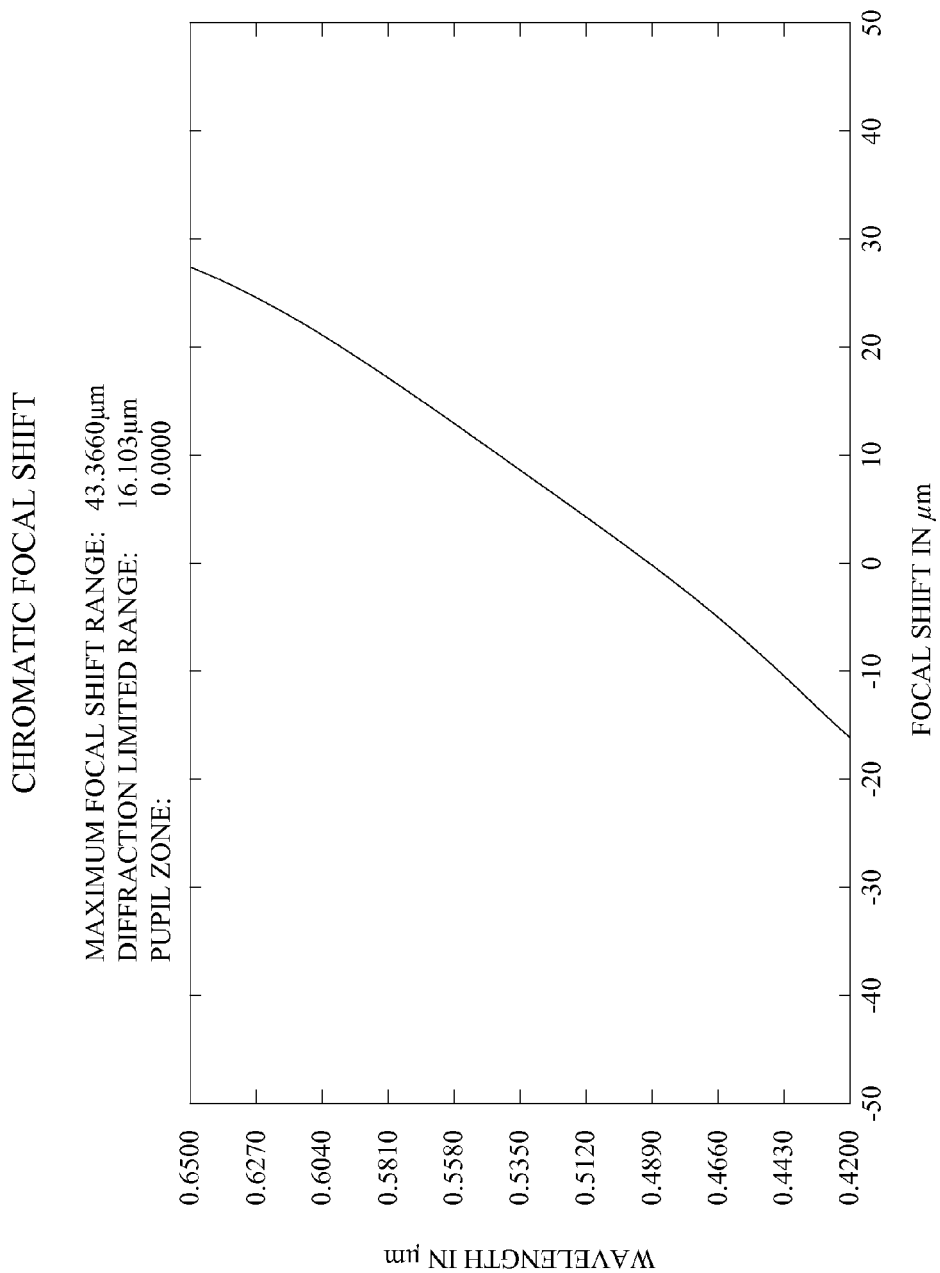
FIG. 16 illustrates a graph of chromatic focal shift for the additional fixed focus optical system according to still other disclosed aspects.

FIG. 16 illustrates a graph of chromatic focal shift for optical arrangement 1202. The chromatic shift is for a range of wavelengths 0.4200 nm through 0.6500 nm. Over this range of wavelengths, the maximum focal shift is 43.3660 μm. Specifically, chromatic focal shift is about −17.5 microns at 0.42 μm wavelength light and about 26 microns for 0.65 μm wavelength light. Note that the chromatic focal shift of optical arrangement 1202 is more than two times larger than the chromatic focal shift of optical arrangement 402, indicative of higher chromatic aberration.

Figure 17:
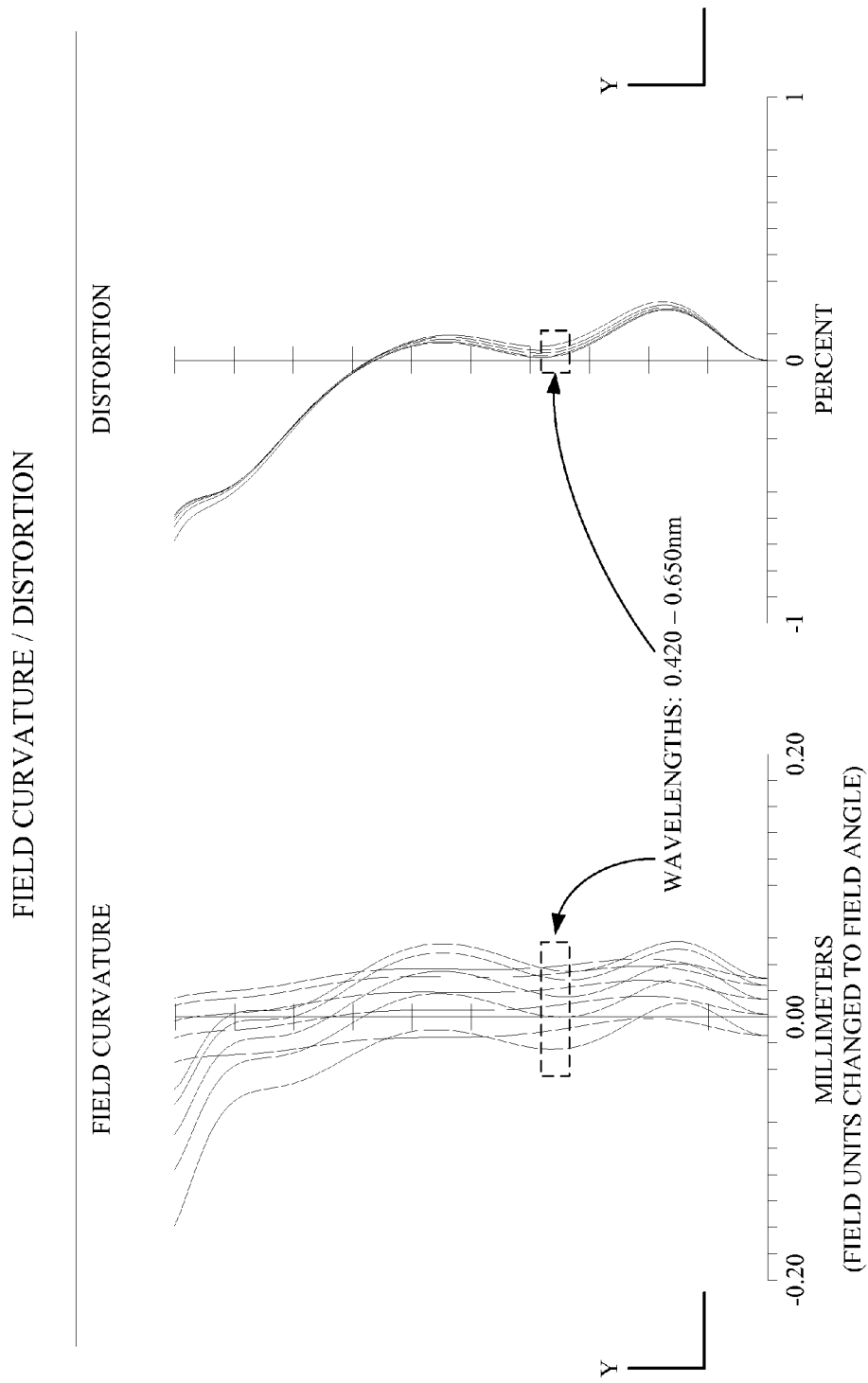
FIG. 17 depicts a graph of field curvature and distortion for the fixed focus optical system of FIG. 12 for a range of depicted wavelengths.

FIG. 17 depicts a graph of field curvature and distortion for optical arrangement 1202. The curvature and distortion graphs are for a range of wavelengths 0.420 µm through 0.650 µm. Note that the distortion for optical arrangement 1202 is between about one and negative 1 percent, as compared with two and negative two percent for optical arrangement 402, above, while field curvature is similar (between 20 and negative 20 microns) for the respective wavelengths.

Figure 18:
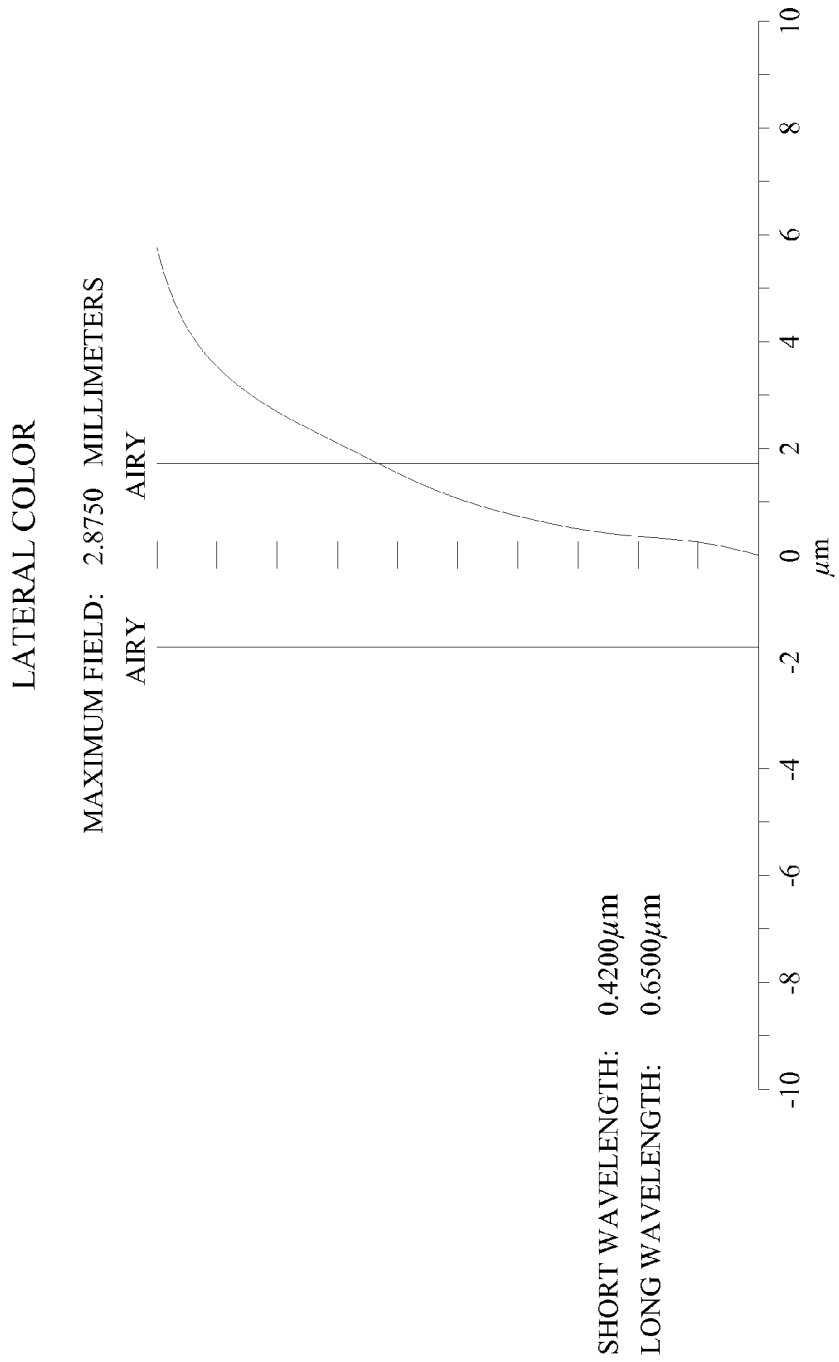
FIG. 18 illustrates a graph of lateral color for the fixed focus optical system of FIG. 12 according to further aspects.

FIG. 18 illustrates a graph of lateral color for optical arrangement 1202. The lateral color curve is for slightly larger positive and negative airy discs as for optical arrangement 402 (e.g., approximately 1.6 microns). The lateral color curve for optical arrangement 1202 is for a maximum field of 2.8750 mm and wavelength range of 0.42 µm to 0.6500 µm.

TABLE 9

MTF Wavelengths and Weights for FIGS. 13, 14 and 15

| Wavelength | Value (in µm) | Weight |
|---|---|---|
| 1 | 0.420000 | 1.000000 |
| 2 | 0.490000 | 1.000000 |
| 3 | 0.550000 | 1.000000 |
| 4 | 0.610000 | 1.000000 |
| 5 | 0.656000 | 1.000000 |

Figure 19:
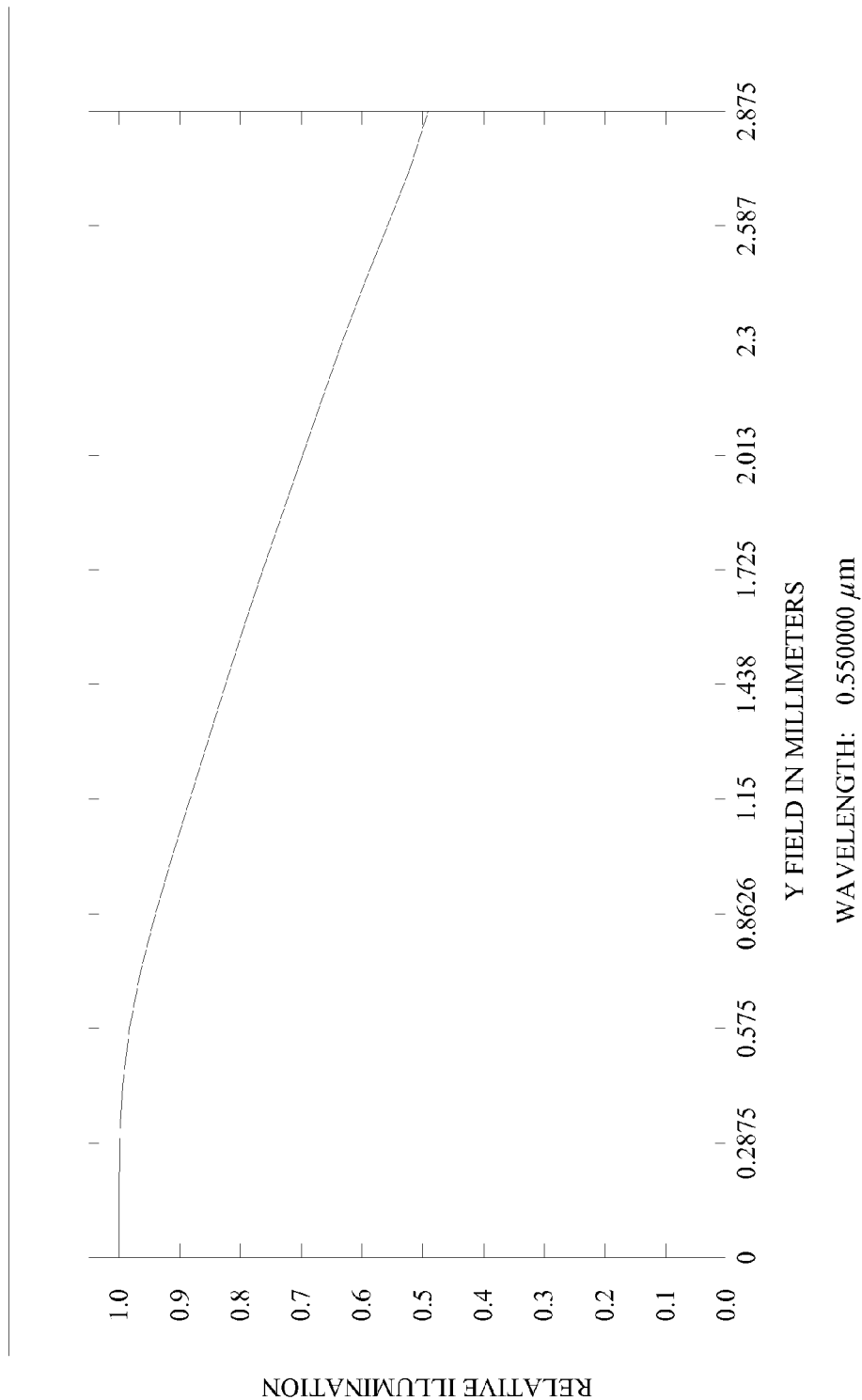
FIG. 19 depicts a graph of relative illumination for the additional fixed focus optical system according to one or more other aspects.

FIG. 19 depicts a graph of relative illumination for optical arrangement 1202. The relative illumination curve for optical arrangement 1202 is very similar to that for optical arrangement 402 depicted at FIG. 11, supra. Specifically, illumination is normalized to 1.0 on axis and decays to about 0.5 at 2.875 mm from the center of the image. Accordingly, the respective optical arrangements 402, 1202 indicate that the difference in relative illumination is minor for the three and four aperture configurations of the respective optical systems 400 and 1200.

Figure 20:
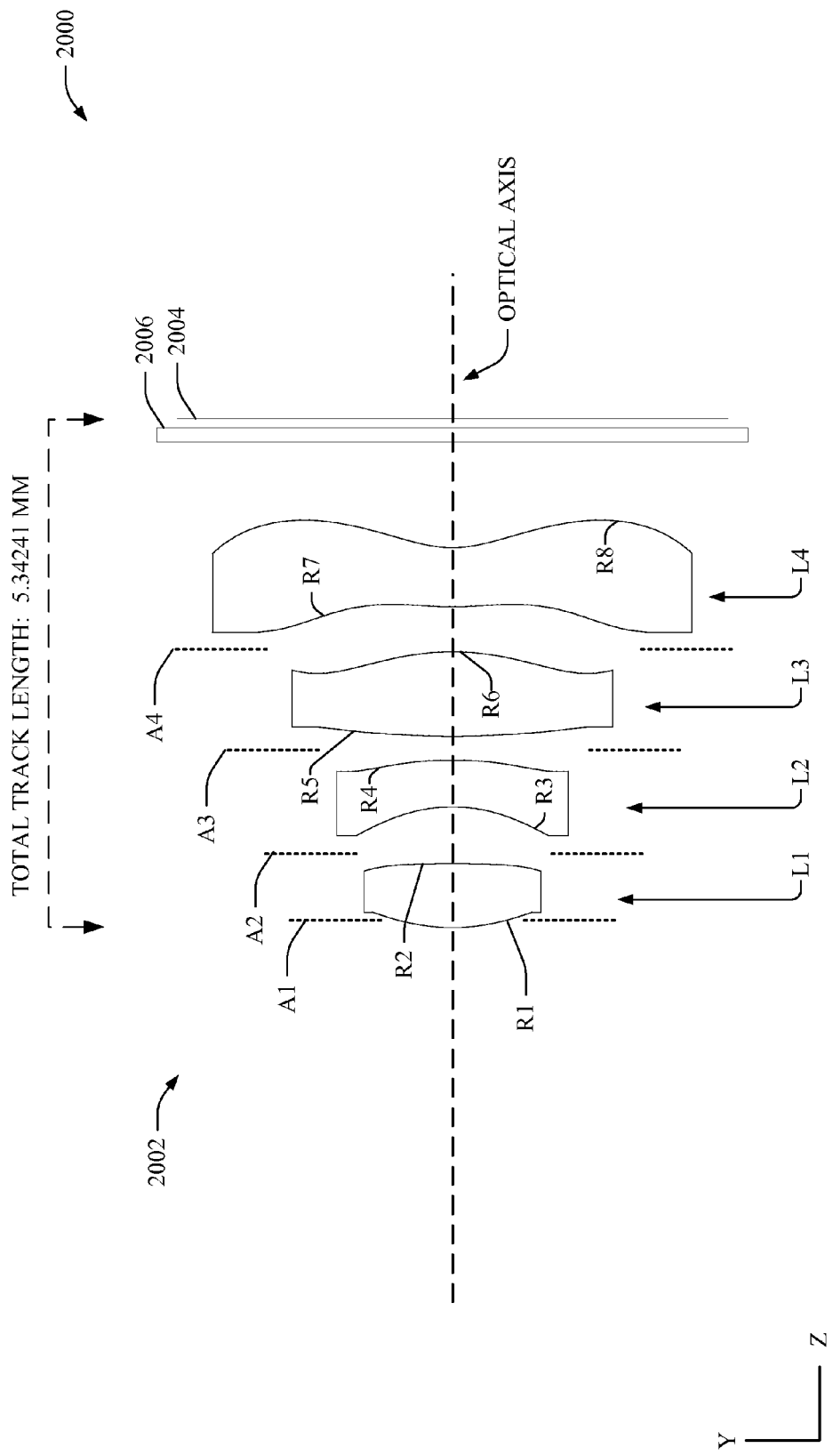
FIG. 20 illustrates a cross-section of an alternate fixed focus optical system having f-number of 2.8 according to still other aspects of the subject disclosure.

FIG. 20 illustrates a cross-sectional view of an additional optical system 2000 according to a particular aspect of the subject disclosure. Specifically, optical system 2000 comprises an arrangement of optical components 2002, an optical sensor 2004 at an in focus image position, as described herein, and a glass plate 2006 over the optical sensor 2004. The arrangement 2002 includes a set of optical lenses L1, L2, L3, and L4, and a set of apertures A1, A2, A3 and A4. Similar to the numbering described above with respect to FIG. 12, lens numbering and aperture numbering start from the object side and count up to the image side. As depicted, aperture A1 is a field stop positioned at the object side surface of lens L1. Apertures A2, A3 and A4 can be utilized to improve image quality and, like optical system 2000, are not defined as aperture stops.

Lenses L1 through L4 each have two opposed refracting surfaces, with surface and radius of curvature denoted by R1, R2, R3, etc., for the respective surfaces. Thus, the surfaces in order from object side to image side are object side surface R1 and image side surface R2 of lens L1, object side surface R3 and image side surface R4 of lens L2, object side surface R5 and image side surface R6 of lens L3, and object side surface R7 and image side surface R8 of lens L4. The respective surface identifiers (R1, R2, R3, ..., R8) also denote the radius of curvature for the respective surfaces in the tables below (Tables 11, 12, 13 and 14). Additionally, refractive index n, denotes the refractive index of the lens medium associated with the $i^{th}$ surface, and v_di is the Abbe number of the lens medium associated with the $i^{th}$ surface.

Similar to optical arrangement 2002, lens L1 can have positive refractive power, where surfaces R1 and R2 are both convex. R2 can also be concave near the optical axis. Further, lens L1 can have large positive refractive power in some aspects. Lens L2 can have a negative refractive power, where surfaces R3 and R4 are concave and convex respectively, at least near the optical axis. Furthermore, lens L2 can have a meniscus shape in at least some aspects of the subject disclosure. Lens L3 can have a positive refractive power, where surfaces R5 and R6 are both convex, at least near the optical axis. In one aspect, surface R5 can be concave near the optical axis. The lens, L4, has a negative refractive power, where surfaces R7 and R8 are, respectively, convex and concave. Lens L4 can have a small positive refractive power. In some aspects, lens L4 can have varying power which is negative near the optical axis and is increasing positively with radial distance from the optical axis. It should be appreciated that other variations of surface curvature and refractive power for lenses L1, L2, L3 and L4 are possible, and within the scope of the subject disclosure.

According to one particular aspect of the subject disclosure, at least one surface of lenses L1, L2, L3, and L4 has an aspheric shape, as described herein. In at least one other aspect, each surface of lenses L1, L2, L3, and L4 have an aspheric shape. According to various aspects, the lenses L1, L2, L3, and L4 can be made of plastic, such as F52R, or SP1516, or a combination thereof. In one specific aspect, lenses L1, L3 and L4 are made of plastic F52R while lens L2 is made of plastic SP1516. It should be appreciated, however, that in other aspects the lenses can be made of materials having similar Abbe numbers and refractive indices instead.

Further to the above, optical arrangement 2002 can have a TTL of under 5.5 mm. Particularly, in at least one embodiment, the TTL is about 5.34241 mm. Moreover, optical arrangement 2002 can produce an image size at the image plane that is greater than about 6.0 mm. Particularly, in at least one embodiment, the image size is about 6.2 mm. Furthermore, the optical arrangement 2002 can have an f-number of about 2.8 in at least one embodiment, and according to one or more other embodiments, a ratio of TTL to image size is about 0.86 or less.

According to one specific aspect of the subject disclosure, a prescription for the respective lenses L1, L2, L3, and L4 is provided in Tables 11-14, below. Table 10 lists general lens data for the respective lenses, and Table 11 lists surface data including radius of curvature (R) (in mm) near the optical axis, distance between surfaces, diameter of the respective lenses, and material of the respective lenses. Furthermore, Table 12 provides aspheric constants A, for i=2, 4, 6, 8, 10, 12, 14, 16 of equation (1), supra, for aspheric surfaces of Table 12, where the index "i" is denoted by "r".

TABLE 10

General Optical Properties for Optical System 2000

| Surfaces (including apertures) | 15 |
|---|---|
| Stops | 1 |
| System Aperture | Float by stop size = 0.75 |
| Apodization | Uniform Factor = 0.00E+00 |
| Temperature (C) | 2.3E+01 |
| Pressure (ATM) | 1.00E+00 |
| Effective Focal Length | 4.301897 (in air at system temp & pressure) |
| Effective Focal Length | 4.301897 (in image space) |
| Back Focal Length | 1.00 |

TABLE 10-continued

General Optical Properties for Optical System 2000

| | |
|---|---|
| TTL | 5.342414 |
| Image Space F/# | 2.867932 |
| Paraxial Working F/# | 2.864937 |
| Working F/# | 2.864937 |
| Image Space NA | 0.169012 |
| Object Space NA | 0.002143 |
| Stop Radius | 0.75 |
| Paraxial Image Height | 2.875 |
| Paraxial Magnification | −0.0125 |
| Entrance Pupil Diameter | 1.5 |
| Entrance Pupil Position | 0 |
| Exit Pupil Diameter | 1.122815 |
| Exit Pupil Position | −3.21679 |
| Field Type | Real Image height in mm |
| Maximum Radial Field | 2.875 |
| Primary Wavelength | 0.55 µm |
| Lens Units | Mm |
| Angular Magnification | 1.335929 |

TABLE 11

Surface Data for Lens Elements for Optical System 2000

| Surface | Type | Radius (mm) | Thickness (mm) | Medium | Diameter (mm) |
|---|---|---|---|---|---|
| OBJ | Standard | Infinity | 350 | | 471.0156 |
| A1 | Standard | Infinity | −0.08 | | 1.5 |
| R1 | Even_Asph | 2.110761 | 0.68046 | F52R-T | 1.7 |
| R2 | Even_Asph | −18.7737 | 0.104221 | | 1.88 |
| A2 | Standard | Infinity | 0.5 | | 6.2 |
| R3 | Even_Asph | −1.73491 | 0.498358 | SP1516-T | 2.04 |
| R4 | Even_Asph | −4.4357 | 0.104871 | | 2.46 |
| A3 | Standard | Infinity | 0.15 | | 6.2 |
| R5 | Even_Asph | 7.15253 | 0.899089 | F52R-T | 3.02 |
| R6 | Even_Asph | −2.62456 | 0.029247 | | 3.41 |
| A4 | Standard | Infinity | 0.45 | | 6.2 |
| R7 | Even_Asph | 3.254004 | 0.629696 | F52R-T | 4.13 |
| R8 | Even_Asph | 1.183141 | 1.104472 | | 5.1 |
| 13 | Standard | Infinity | 0.15 | 1.5231, 55.0000 | 6.2 |
| 14 | Standard | Infinity | 0.042 | | 6.2 |
| IMA | Standard | Infinity | 6.2 | | 6.2 |

| Surface | Conic | Note |
|---|---|---|
| OBJ | 0 | |
| A1 | 0 | Stop 1 |
| R1 | −0.66107 | L1-1 |
| R2 | 0 | L1-2 |
| A2 | 0 | Stop 2 |
| R3 | −9.58919 | L2-1 |
| R4 | 0 | L2-2 |
| A3 | 0 | Stop 3 |
| R5 | 20.5575 | L3-1 |
| R6 | 0 | L3-2 |
| A4 | 0 | Stop 4 |
| R7 | −72.4159 | L4-1 |
| R8 | −6.75472 | L4-2 |
| 13 | 0 | CG(D263T) |
| 14 | 0 | |
| IMA | 0 | |

TABLE 12

Aspheric Coefficients for Lenses L1, L2, L3, L4 of Optical System 2000

| Surface | | |
|---|---|---|
| | R1 | |
| | Coeff on r2 | 0 |
| | Coeff on r4 | 0.00061 |
| | Coeff on r6 | −0.06929 |
| | Coeff on r8 | 0.203978 |
| | Coeff on r10 | −0.37923 |
| | Coeff on r12 | 0.274487 |
| | Coeff on r14 | −0.1281 |
| | Coeff on r16 | 0.114087 |
| Surface | R2 | |
| | Coeff on r2 | 0 |
| | Coeff on r4 | −0.06561 |
| | Coeff on r6 | 0.065376 |
| | Coeff on r8 | −0.15735 |
| | Coeff on r10 | 0.148254 |
| | Coeff on r12 | −0.11627 |
| | Coeff on r14 | 0.006953 |
| | Coeff on r16 | 0.046706 |
| Surface | R3 | |
| | Coeff on r2 | 0 |
| | Coeff on r4 | −0.30165 |
| | Coeff on r6 | 0.5072 |
| | Coeff on r8 | −0.69532 |
| | Coeff on r10 | 0.73948 |
| | Coeff on r12 | −0.5071 |
| | Coeff on r14 | 0.179696 |
| | Coeff on r16 | −0.02217 |
| Surface | R4 | |
| | Coeff on r2 | 0 |
| | Coeff on r4 | −0.12194 |
| | Coeff on r6 | 0.273925 |
| | Coeff on r8 | −0.29861 |
| | Coeff on r10 | 0.228015 |
| | Coeff on r12 | −0.10251 |
| | Coeff on r14 | 0.024576 |
| | Coeff on r16 | −0.00271 |
| Surface | R5 | |
| | Coeff on r2 | 0 |
| | Coeff on r4 | −0.07022 |
| | Coeff on r6 | 0.070783 |
| | Coeff on r8 | −0.03727 |
| | Coeff on r10 | 0.004837 |
| | Coeff on r12 | 0.001944 |
| | Coeff on r14 | −0.00015 |
| | Coeff on r16 | −0.00022 |
| Surface | R6 | |
| | Coeff on r2 | 0 |
| | Coeff on r4 | 0.023531 |
| | Coeff on r6 | 0.013938 |
| | Coeff on r8 | −0.00216 |
| | Coeff on r10 | 0.000315 |
| | Coeff on r12 | 0.000113 |
| | Coeff on r14 | −3.34E−05 |
| | Coeff on r16 | −5.88E−06 |
| Surface | R7 | |
| | Coeff on r2 | 0 |
| | Coeff on r4 | −0.12068 |
| | Coeff on r6 | 0.045816 |
| | Coeff on r8 | −0.01133 |
| | Coeff on r10 | 0.002249 |
| | Coeff on r12 | −0.00023 |
| | Coeff on r14 | 2.07E−06 |
| | Coeff on r16 | 6.32E−07 |
| Surface | R8 | |
| | Coeff on r2 | 0 |
| | Coeff on r4 | −0.04847 |
| | Coeff on r6 | 0.010318 |
| | Coeff on r8 | −0.00138 |
| | Coeff on r10 | −1.47E−05 |
| | Coeff on r12 | 3.00E−05 |
| | Coeff on r14 | −3.61E−06 |
| | Coeff on r16 | 1.32E−07 |

Figure 21:
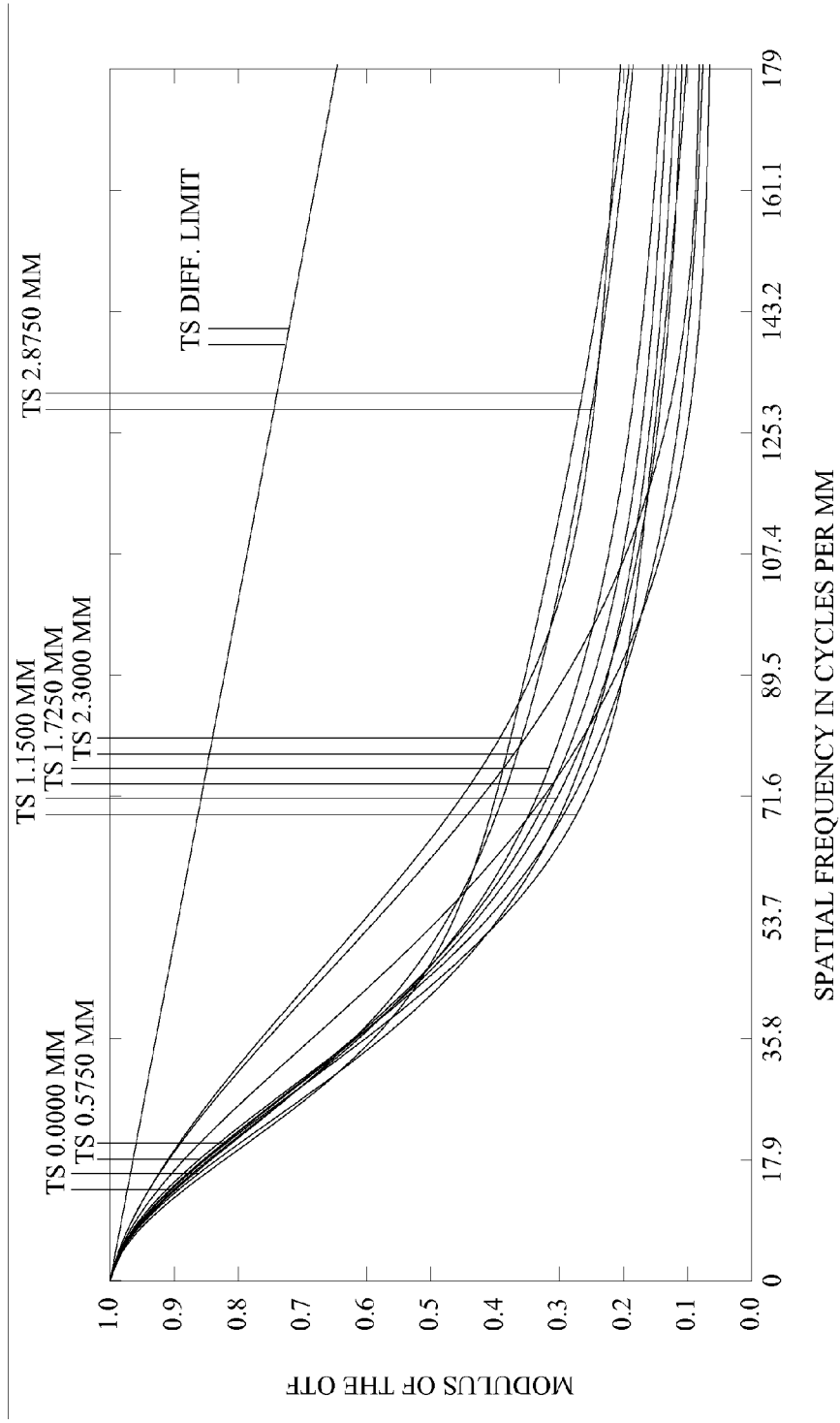
FIG. 21 depicts a graph of MTF response for 350 mm OD for the alternate fixed focus optical system.
Figure 22:
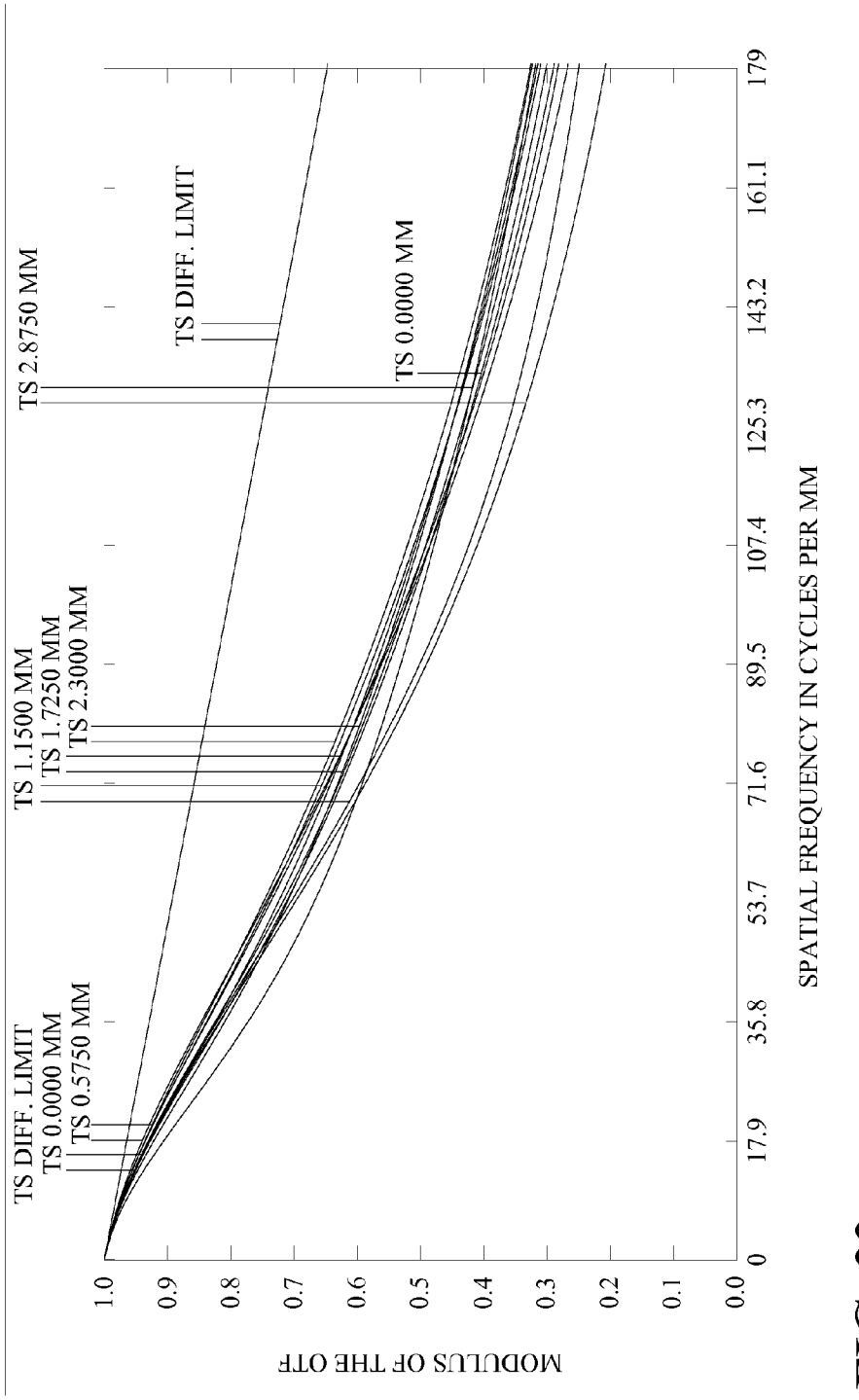
FIG. 22 illustrates a graph of MTF response for 1000 mm OD for the alternate fixed focus optical system.
Figure 23:
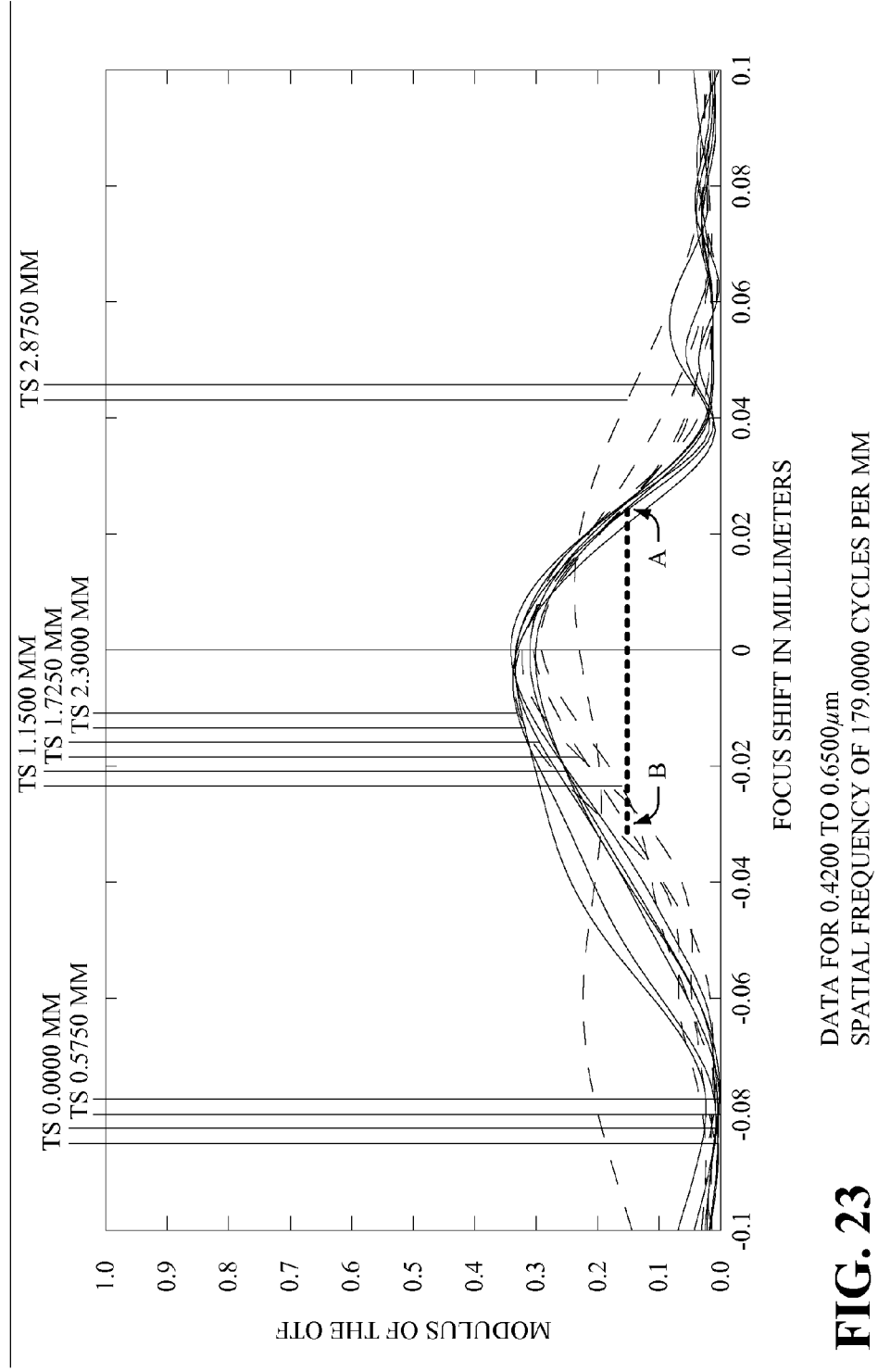
FIG. 23 depicts a graph of TF-MTF for a range of positive and negative focal shifts for the fixed focus optical system of FIG. 20.

FIGS. 21-27 depict various optical responses for optical arrangement 2002. Specifically, FIG. 21 illustrates polychromatic diffraction MTF for an object at 350 mm OD. In addition, FIG. 22 illustrates polychromatic diffraction MTF for an object at 1000 mm OD. The MTF curves 21 and 22, as well as MTF curve 23, employ wavelengths and weights as listed in Table 13, below. As described herein, the wavelengths and weights are not exclusive, but are intended to be merely representative of an optical spectrum sensitive to optical sensor 2004. Additionally, FIG. 21 shows that MTF remains above 0.5 for spatial frequencies up to about 40 cycles per mm and above 0.3 for spatial frequencies up to about 70 cycles per mm, for 350 mm OD. FIG. 22 on the other hand, shows a greater image resolution at OD=1000 mm. Specifically, the MTF value is above 0.5 for spatial frequencies up to about 107 cycles per mm for small to medium field angles, and above 0.3 for spatial frequencies at high resolution (~180 cycles per mm for most field angles). FIG. 23 depicts a TF-MTF that peaks at about 0.31 at an in focus object distance (image distance=0). Further, the MTF value remains above a minimum threshold of about 0.15 for a range of positive and negative focal shifts A and B, respectively. Specifically, the MTF can remain above about 0.15 for negative focal shifts up to about 35 microns, and positive focal shifts up to about 25 microns. In addition, the TF-MTF remains above 0.1 for negative focal shifts up to about 50 microns.

TABLE 13

MTF Wavelengths and Weights for FIGS. 21, 22 and 23

| Wavelength | Value (in μm) | Weight |
|---|---|---|
| 1 | 0.42 | 1 |
| 2 | 0.49 | 1 |
| 3 | 0.55 | 1 |
| 4 | 0.61 | 1 |
| 5 | 0.65 | 1 |

Figure 24:
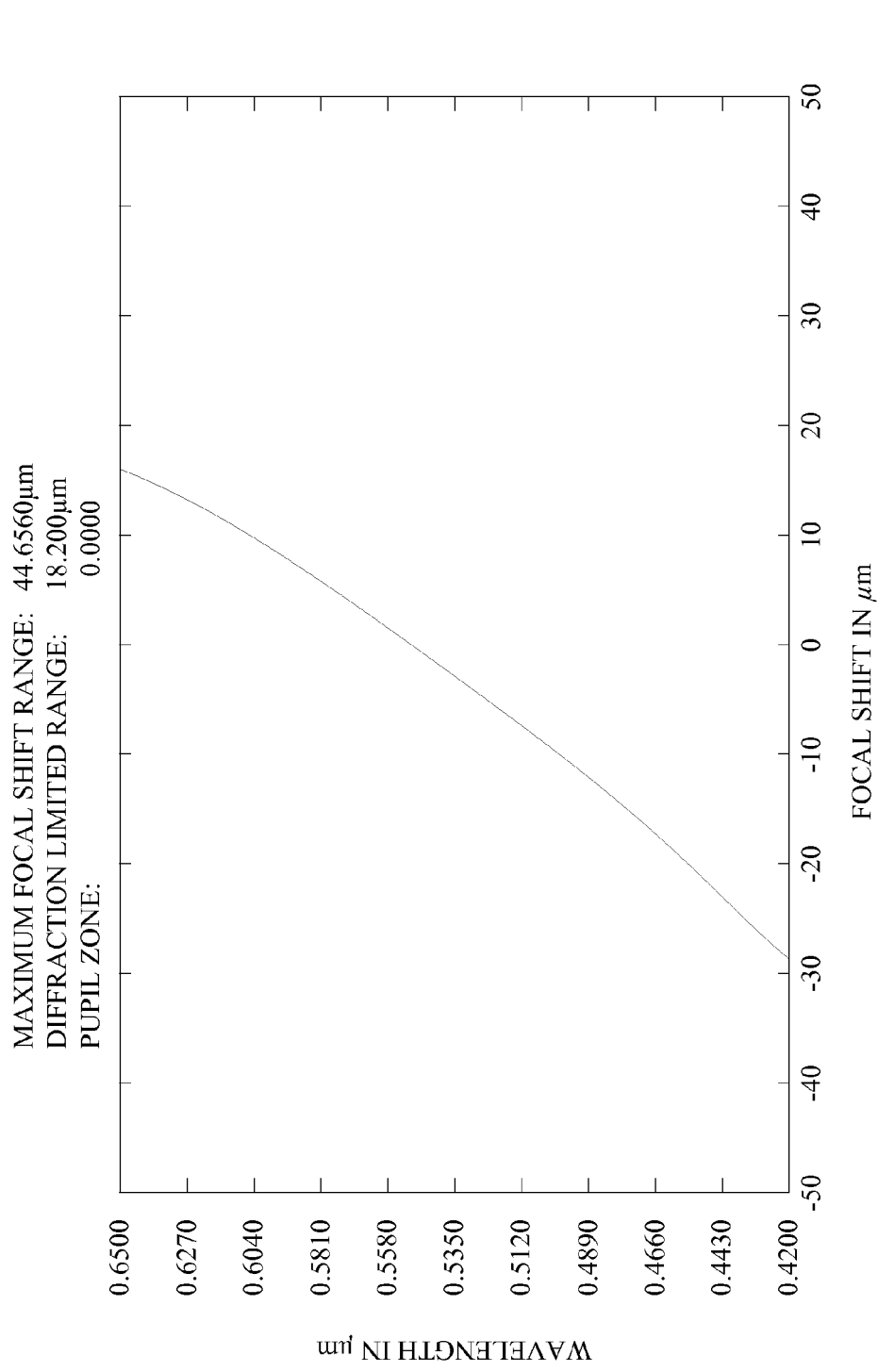
FIG. 24 depicts a graph of chromatic focal shift for the fixed focus optical system of FIG. 20 according to further aspects.

FIGS. 24, 25, 26 and 27 depict respective graphs of chromatic focal shift, field curvature and distortion, lateral color and relative illumination for optical arrangement 2002. As depicted, the respective graphs provide similar responses for optical arrangements 1202 and 2002, with some slight variation. The chromatic focal shift for optical arrangement 2002 is depicted at FIG. 24. As can be seen from the graph, chromatic focal shift ranges from about −28 microns to about positive 15 microns, at wavelengths 0.4200 through 0.6500, respectively. This results in a maximum focal shift range of 44.656 μm.

Figure 25:
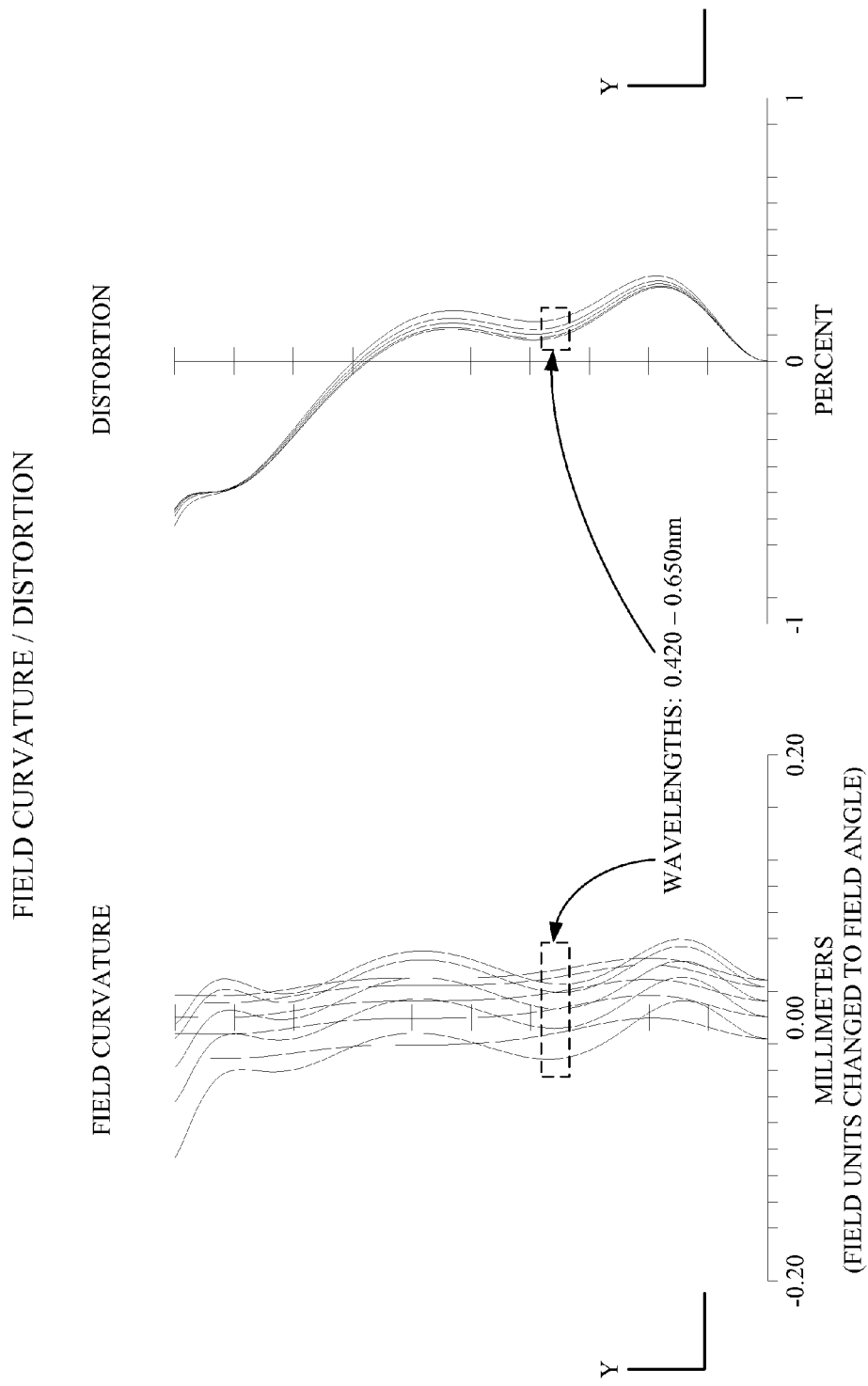
FIG. 25 illustrates a graph of field curvature and distortion for the alternate fixed focus optical system.

Field curvature and distortion is depicted at FIG. 25. As can be seen, field curvature is well within a range of positive 20 microns and negative 20 microns for 0.42 μm wavelength light and 0.65 μm wavelength light. The distortion for optical arrangement 2002 is significantly smaller than that for optical arrangement 402, and similar to the distortion response for optical arrangement 1202. Particularly, distortion ranges well within one and negative one percent for the above wavelengths.

Figure 26:
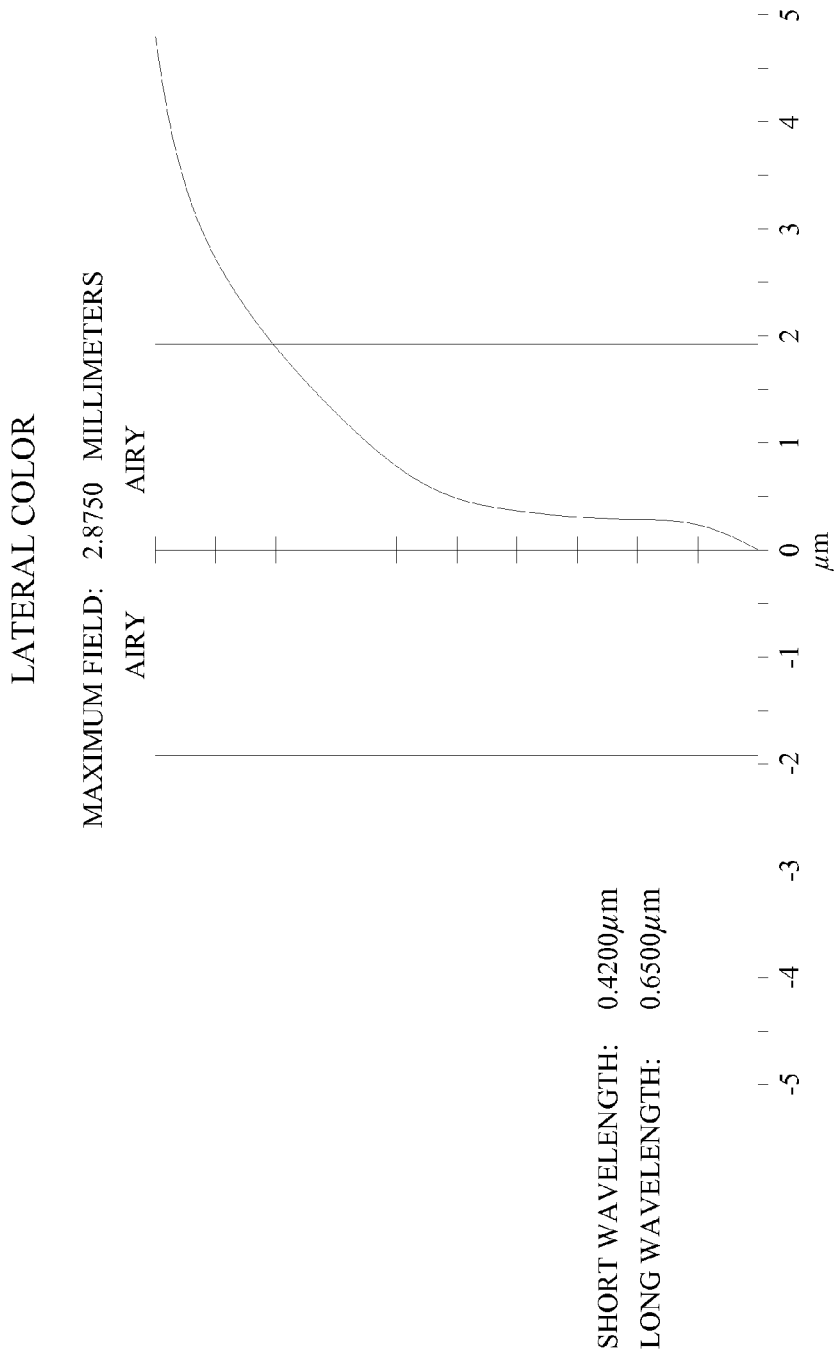
FIG. 26 illustrates a graph of lateral color for the fixed focus optical system of FIG. 20 according to one or more aspects.
Figure 27:
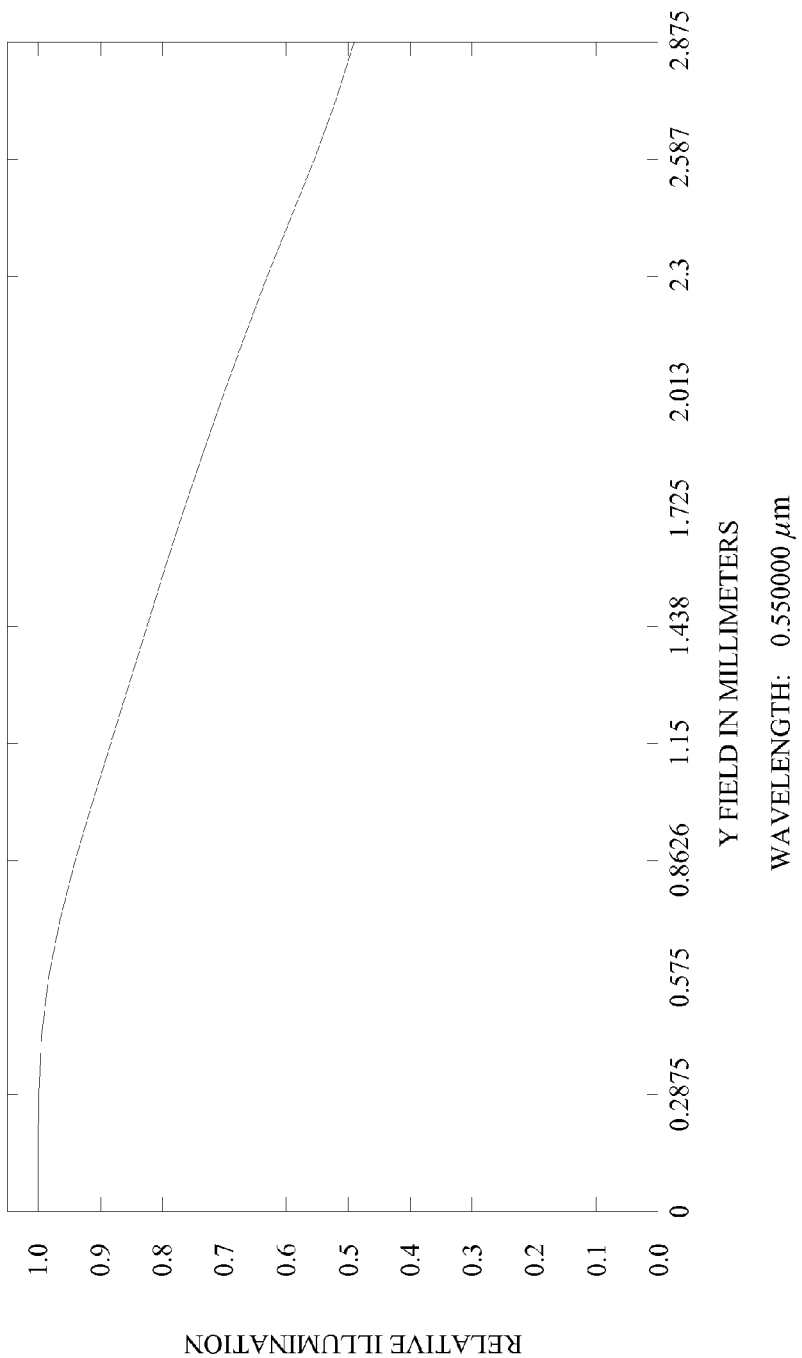
FIG. 27 depicts a graph of relative illumination for the fixed focus optical system of FIG. 20 according to additional aspects.

The lateral color depicted at FIG. 26 for optical arrangement 2002 corresponds to a larger airy disc than both optical arrangements 402 and 2002. Particularly, the lateral color extends well beyond 2 microns at higher field angles. Relative illumination, on the other hand, is nearly identical for optical arrangements 2002 and 1202, as might be expected for the similar positioning of apertures A1, A2, A3 and A4 of the respective arrangement 2002, 1202. Specifically, the relative illumination is normalized to 1.0 at the image center and drops off to about 0.5 at 2.875 mm from the center of the image.

As utilized herein, the word "exemplary" is intended to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the claimed subject matter. It is, of course, not possible to describe every conceivable combination of components or methodologies for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. An optical system comprising:
   a plurality of optical elements arranged along a common optical axis for forming a real image of an object, said optical elements including:
   a first lens having a positive refractive power, with both the surface facing the object side and the surface facing the image side having convex shapes;
   a second lens having a negative refractive power and a meniscus shape, with the surface facing the object side having a concave shape near the optical axis and the surface facing the image side having a convex shape near the optical axis;
   a third lens;
   a fourth lens having a meniscus shape near the optical axis, with the surface facing the object side having a convex shape-near the optical axis and the surface facing the image side having a concave shape near the optical axis; and
   a fifth lens having a small negative refractive power and a meniscus shape, with the surface facing the object side having a convex shape near the optical axis and the surface facing the image side having a concave shape near the optical axis; wherein
   the total track length (TTL) of the optical system is less than about 5.5 mm, and
   the ratio of the TTL of the optical system to a diameter of the real image is less than 0.95.

2. The optical system of claim 1, wherein the third lens having a small positive refractive power and having a concave surface facing the object side and a convex surface facing the image side.

3. The optical system of claim 1, wherein the fifth lens having a varying refractive power which is negative at the optical axis and progressively positive away from the optical axis.

4. The optical system of claim 1, wherein the F-number of the optical system is approximately 2.4.

5. The optical system of claim 1, wherein an MTF of the optical system has a contrast level of at least 0.15 at a spatial frequency of approximately one half of the Nyquist frequency of the sensor for an object distance associated with the real image of approximately 350 millimeters.

6. The optical system of claim 1, wherein an MTF of the optical system includes values ranging from 0 to 0.39.

7. The optical system of claim 1, further comprising:
an image sensor defining an imaging surface; and
the image sensor including approximately 8 million pixels; wherein,
the image sensor including a pixel having a length of approximately 1.4 micro meters.

8. The optical system of claim 1, wherein the chromatic focal shift of the optical system is limited to below approximately 18 micro meters across the visible spectrum.

9. The optical system of claim 1, wherein the lateral color range for the optical system is approximately between 3 and 4 micro meters.

10. The optical system of claim 1, further comprising: one or more optical stops for mitigating stray light or for defining a pupil size for the optical system.

11. The optical system of claim 1, wherein the lenses are made of plastic.

12. A fixed-focal length imaging system for a camera comprising:
a set of five lenses having a common optical axis for forming a real image of an object, the set of five lenses comprising:
a first lens;
a second lens;
a third lens;
a fourth lens; and
a fifth lens, wherein:
a total track length (TTL) of the imaging system is less than approximately 5.4 millimeters; and
the ratio of the TTL to a real image circle diameter is less than approximately 0.95.

13. The fixed-focal length imaging system of claim 12, further comprising an image sensor defining an imaging surface.

14. The fixed-focal length imaging system of claim 13, wherein the image sensor comprises approximately 8 million pixels.

15. The fixed-focal length imaging system of claim 13, wherein the image sensor includes a pixel having a length of approximately 1.4 micro meters.

16. The fixed-focal length imaging system of claim 12, exhibiting an asymmetric modulation transfer function (MTF) that remains above 0.15 for a larger range of negative focal shifts than a range of positive focal shifts.

17. The fixed-focal length imaging system of claim 16, wherein the range of negative focal shifts is approximately between 1.5 and 2 times more than the range of positive focal shifts.

18. The fixed-focal length imaging system of claim 12, wherein the camera is implemented as part of a portable electronics device.

19. The fixed-focal length imaging system of claim 12, wherein at least one lens of the set of five lenses is made of plastic.

20. The fixed-focal length imaging system of claim 19, wherein each lens of the set of five lenses is made of a subset of a set of suitable optical-grade plastic materials.

21. An optical system comprising:
a plurality of optical elements arranged along a common optical axis for forming a real image of an object, the plurality of optical elements including:
a first lens having a positive refractive power, with both the surface facing the object side and the surface facing the image side having convex shapes;
a second lens having a negative refractive power;
a third lens;
a fourth lens; and
a fifth lens having a small negative refractive power near the optical axis; wherein
the total track length (TTL) of the optical system is less than about 5.5 mm, and
the ratio of the TTL of the optical system to a diameter of the real image is less than 0.95.

* * * * *